United States Patent
Williams et al.

(10) Patent No.: US 11,913,918 B2
(45) Date of Patent: *Feb. 27, 2024

(54) CHROMATOGRAPHY SYSTEM

(71) Applicant: Puridify Ltd., Hertfordshire (GB)

(72) Inventors: Michael Williams, Somerset (GB); Iwan Roberts, London (GB); Oliver Hardick, London (GB); Matthew Townsend, Cambridge (GB); Christopher Morris, Hitchin (GB); Shameer Subratty, London (GB)

(73) Assignee: PURIDIFY LTD., Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/737,163

(22) Filed: May 5, 2022

(65) Prior Publication Data

US 2022/0268745 A1 Aug. 25, 2022

Related U.S. Application Data

(62) Division of application No. 16/327,985, filed as application No. PCT/GB2017/052508 on Aug. 25, 2017, now Pat. No. 11,353,433.

(30) Foreign Application Priority Data

Aug. 26, 2016 (GB) ..................... 1614573
Mar. 31, 2017 (GB) ..................... 1705232

(51) Int. Cl.
*G01N 30/38* (2006.01)
*G01N 30/60* (2006.01)

(52) U.S. Cl.
CPC ......... *G01N 30/38* (2013.01); *G01N 30/6017* (2013.01); *G01N 2030/386* (2013.01)

(58) Field of Classification Search
None
See application file for complete search history.

(56) References Cited

U.S. PATENT DOCUMENTS

| 4,537,217 A | 8/1985 | Allen, Jr. |
| 4,676,898 A | 6/1987 | Saxena |

(Continued)

FOREIGN PATENT DOCUMENTS

| FR | 2645965 A1 | 10/1990 |
| WO | 00/048703 A1 | 8/2000 |

(Continued)

OTHER PUBLICATIONS

PCT International Search Report and Written Opinion for PCT Application No. PCT/GB2017/052508 dated Jan. 4, 2018 (16 pages).

(Continued)

*Primary Examiner* — Justin N Olamit
(74) *Attorney, Agent, or Firm* — Eversheds Sutherland (US) LLP

(57) ABSTRACT

A chromatography system for at least one of tangential flow chromatography and lateral flow chromatography comprising: an inlet; a functionalised adsorbent chromatography medium downstream of the inlet; an outlet downstream of the adsorbent chromatography medium; and a flow guide downstream of the inlet and upstream of the adsorbent chromatography medium and configured to distribute a flow of a liquid from the inlet across a width of the adsorbent chromatography medium; wherein the flow guide comprises a pattern of channels providing flow paths from the inlet to different parts of the adsorbent chromatography medium along the width of the adsorbent chromatography medium, wherein the pattern of channels is provided so as to reduce a difference in arrival time and/or flow velocity of liquid (Continued)

reaching the adsorbent chromatography medium across the width of the adsorbent chromatography medium.

20 Claims, 27 Drawing Sheets

(56) References Cited

U.S. PATENT DOCUMENTS

| | | | |
|---|---|---|---|
| 5,059,654 | A | 10/1991 | Hou et al. |
| 5,354,460 | A * | 10/1994 | Kearney ............... B01J 47/022 |
| | | | 210/291 |
| 5,667,676 | A | 9/1997 | Alaska |
| 5,972,218 | A | 10/1999 | Josic et al. |
| 6,139,746 | A | 10/2000 | Kopf |
| 6,156,273 | A * | 12/2000 | Regnier ............. G01N 30/6095 |
| | | | 204/600 |
| 6,294,090 | B1 | 9/2001 | Nussbaurner et al. |
| 6,923,908 | B1 | 8/2005 | Thompson et al. |
| 7,178,386 | B1 | 2/2007 | Gamble et al. |
| 7,261,812 | B1 | 8/2007 | Karp et al. |
| 8,709,809 | B2 | 4/2014 | Wen et al. |
| 9,029,517 | B2 | 5/2015 | Yavorsky et al. |
| 10,201,767 | B2 | 2/2019 | Olovsson |
| 10,850,259 | B2 | 12/2020 | Hardick et al. |
| 10,865,224 | B2 | 12/2020 | Xenopoulos et al. |
| 2011/0108522 | A1 * | 5/2011 | Rozing ............. G01N 30/6095 |
| | | | 264/293 |
| 2020/0101399 | A1 | 4/2020 | Skudas |

FOREIGN PATENT DOCUMENTS

| | | |
|---|---|---|
| WO | 01/54790 A1 | 8/2001 |
| WO | 2012/081983 A1 | 6/2012 |
| WO | 2015/052460 A1 | 4/2015 |

OTHER PUBLICATIONS

GB Search Report for GB Application No. 1614573.2 dated May 22, 2017 (4 pages).
Chinese Office Action for CN Application No. 201780052087.9, dated Nov. 18, 2020 (25 pages with English Translation).
"Nanofiber Adsorbents for High Productivity Downstream Processing" by Hardi ck et al., Biotechnology and Bioengineering, vol. 10, No. 4, pp. 1119-1128, Apr. 2013.
"Liquid CHromatography Problem Solving and Troubleshooting", Journal of Chromatographic Science, vol. 36, p. 276, May 1998.

* cited by examiner

CHROMATOGRAPHY SYSTEM

CROSS REFERENCE TO RELATED APPLICATIONS

This application is a divisional of and claims the priority benefit of U.S. application Ser. No. 16/327,985, filed Feb. 25, 2019, which claims the priority benefit of PCT/GB2017/052508 filed on Aug. 25, 2017, which claims priority benefit of Great Britain Application Nos. 1614573.2 and 1705232.5, filed Aug. 26, 2016 and Mar. 31, 2017, respectively, the entire contents of which are hereby incorporated by reference herein.

FIELD OF THE INVENTION

The present invention relates to a chromatography system, a method of manufacturing a chromatography system, a method of performing tangential flow filtration and at least one of tangential flow chromatography and lateral flow chromatography, and a process for isolating one or more biological molecules from a mobile phase. More particularly, the present invention relates to chromatography using a functionalised adsorbent chromatography medium which may be suitable for isolating biological molecules from mobile phases.

BACKGROUND TO THE INVENTION

The biotechnology market is the fastest growing sector within the world pharmaceutical market, accounting for 20% ($153 bn) of all market sales in 2012. This growth from 10% of the market share in 2002 is set to grow by 41% between 2012 and 2018 from $153 bn to $215 bn and in 2016 is at $200 bn. There are currently around 200 monoclonal antibody (MAb) products on the market, and with over 1000 in clinical trials, the need for technological advancement in this area is clear. Over the last few decades typical fermentation titres of biomolecules in industrial settings have grown from 0.5 g/L—to ~5 g/L now being common, with levels of up to 10 g/L observed in some cases. Yet, while the downstream purification processes have also received some research and development, improvements in this area have not matched those in the upstream.

The manufacture of therapeutic proteins requires that a high degree of purity be achieved during processing so that the protein to be administered is substantially devoid of harmful contaminants. Currently, on industrial scale, chromatography is the dominant methodology used to achieve high purity proteins. The heavily relied on chromatography unit operations are, in economic terms, the key to advancements in the downstream processing of biomolecules, such as MAbs. Chromatography accounts for up to 60% of biotherapeutic processing (Re-use of Protein A Resin: Fouling and Economics, Mar. 1, 2015 BioPharm International, Volume 28, Issue 3, Anurag S. Rathore, Mili Pathak, Guijun Ma, Daniel G. Bracewell).

Such chromatographic separations involve binding of i) the target molecule and/or, ii) one or more impurities, to a solid phase when a liquid phase containing the target molecule and impurities is contacted with the solid phase. The interaction between target molecule/impurities and the solid phase can be based on ionic interaction, hydrophobicity, affinity or a combination thereof.

Chromatography units (regardless of whether they are for radial flow chromatography or lateral flow chromatography) comprise three common elements, namely an inlet, annuluses and an outlet. The inlet is where the incoming processing fluid from the feed tube or pipe undergoes an expansion event. The annuluses are channels upstream and downstream of the chromatographic media. The outlet is where there is a volume reduction event as the fluid exits the tube or pipe.

The chromatographic unit is connected to a feed pipe or tube of smaller cross sectional area/width/circumference than that of the chromatographic media. Therefore there is a significant volume expansion event which can lead to mixing or separation of the incoming pulse.

The space between chromatographic media and enclosing face of the housing creates annuluses both upstream and downstream of the chromatographic media.

Radial flow and lateral/tangential flow chromatographic units share a commonality in that the position at which the inlet and outlet meet the annuluses are at the furthest edges of their respective sides of the chromatographic media. In doing so the path length between outlet and inlet represents the longest possible path length through the unit and chromatographic media. This is different from axial flow chromatography where the inlet and outlet are arranged so that the inlet and outlet are positioned so that the space between them represents the shortest possible path length Thus the fact that in radial flow the edge of the media presented to the inlet/outlet is a circumference and in lateral/tangential flow it is planar makes little difference as from a fluid flow perspective and so design of the ideal unit. Features that minimise mixing and that improve distribution across the annuluses when the inlet and outlet are positioned at opposite ends of the annuluses can be applied to both orientations of chromatographic media.

At the outlet, the converse of the inlet takes place as the volume leaving the annulus is reduced to exit the unit.

Typically, chromatographic processes involve pulses of liquids (e.g. buffers, solutions that include proteins etc.) flowing to the chromatography unit that includes chromatographic media. These pulses of liquid can undesirably mix with each other and/or be poorly distributed across the chromatographic media. Mixing and poor distribution can lead to the pulse that is introduced to the chromatographic system exiting in a larger volume/time than at which it was introduced resulting in negative performance effects such as product dilution and/or increased buffer usage. Additionally, poor distribution of the pulse can result in poor utilisation of the chromatography media due to the failure of the pulse to come into contact with the entirety of the chromatographic media.

Mixing of liquid from different pulses and/or poor distribution has the following negative impacts on performance as it i) reduces the resolution of the separation ii) requires an increase in the liquid volume of each pulse to ensure adequate contact with the media iii) reduces the concentration of the eluted product and iv) reduces the effective capacity of the chromatographic media due to under-utilisation of binding sites.

Resolution is a key criteria of any chromatographic separation stage as the ability to selectively elute from the media via alteration in buffer composition e.g. conductivity allows closely related species to be separated.

Minimising the volumes of the buffers pulsed through the units is important for cost effective operation. At industrial scale buffers represent a key cost component of the separation due to the associated costs of infrastructure and labour to produce high quality water and formulate them in the production environment.

Product dilution is undesirable for both the main modes of operation of chromatographic systems a) flow-through b) bind-elute, as it means subsequent unit operations need to cope with a larger liquid volume to process. In flow-through operation the target species in the pulse passes through the chromatographic media unbound whilst contaminants are bound and prevented from exiting the column due to their interaction with the media. Any mixing within the system leads to an increase in time for the entire pulse to exit the system. This time delay equates to target species leaving the system in a larger volume of liquid. In bind-elute operation after the target species is bound to the chromatographic media in a load pulse it is selectively eluted via a subsequent pulse containing a concentration of ions or similar species to displace the bond target species. The elution pulse might also consist of a gradient of ions or similar species. The longer it takes for this elution species to fully displace the target species the larger the volume the target species leaves the column in and so results in a dilution effect.

Underutilisation of the chromatographic media results in an increase in cost of the system as more chromatographic media is needed to process the same about of target species resulting in an increase in scale and so associated costs. Yield is a vital metric of the separation stage and so minimising un-bound product leaving the system during the load phase is critical. However, poor distribution or mixing can lead to preferential flow (or channeling) in subsections of the chromatographic media leading these sites becoming saturated with bound target species and thus passing through before the rest of the media has reached capacity Channeled overloading in this manner leads to product being lost by exiting the system during the load phase before all available binding sites have been accessed. Therefore to stop this loss the load pulse is stopped before, or in the early stages, of such breakthrough before the chromatographic media has been fully utilised.

Therefore, it is desirable to increase the resolution, effective capacity and/or target species concentration of a chromatography system, preferably whilst minimising buffer usage.

SUMMARY OF THE INVENTION

According to an embodiment of the present invention, there is provided a chromatography system comprising:
an inlet;
a functionalised adsorbent chromatography medium downstream of the inlet;
an upstream channel member arranged relative to the adsorbent chromatography medium such that an upstream surface of the adsorbent chromatography medium and a medium-facing surface of the upstream channel member form an upstream channel through which a flow of a liquid flows from the inlet into the adsorbent chromatography medium; and
an outlet downstream of the adsorbent chromatography medium;
wherein a cross-sectional area of the upstream channel formed by the upstream surface of the adsorbent chromatography medium and the medium-facing surface of the upstream channel member decreases away from the inlet.

By providing that the cross-sectional area of the upstream channel decreases away from the inlet, the capacity of the chromatography system is increased. In particular, the effect of providing that the cross-sectional area of the upstream channel decreases away from the inlet can be seen from a comparison between FIG. 3 (for the comparative example) and FIG. 4 (for an embodiment of the present invention). In particular, the time lag from when the region of the adsorbent chromatography medium closest to the inlet reaches its peak reagent concentration and when the regions closest to the outlet reach their peak reagent concentration is decreased. Hence, peak spreading is reduced, such that the possibility of mixing between different pulses of liquid is reduced. This increases the resolution, reduces required pulse volumes, increases capacity and increases concentration of target species leaving the chromatography system. The peak reagent concentration at the adsorbent chromatography medium is increased.

According to an embodiment of the present invention, there is provided a chromatography system comprising:
an inlet;
a functionalised adsorbent chromatography medium downstream of the inlet;
an outlet downstream of the adsorbent chromatography medium; and
a channel member arranged relative to the adsorbent chromatography medium such that a surface of the adsorbent chromatography medium and a medium-facing surface of the channel member form a channel through which a flow of a liquid flows adjacent to the adsorbent chromatography medium;
wherein the medium-facing surface of the channel member comprises ridges spaced at most 5 mm apart and extending in a downstream direction.

The reduction of dead volume (area not containing chromatographic media) in a unit is critical to the reduction of mixing. The use of ridges that abut, or nearly contact, the surfaces at the inlet/outlet or in the annuluses take out a significant proportion of unused volume. The ridges also aid in the channeling of flow inline with the bulk flow of the unit and so reduce areas where recirculation/mixing could be possible.

From an assembly and manufacturing perspective the ridges allow the surfaces that make up the annuluses and the inserted elements such as the flow distributers physically touch each other whilst still allowing flow through the channels created by the ridges. This is critical as in the pursuit of dead volume reduction all void spaces are reduced and so using locating elements helps ensure that flow channels are all equal and thus achieve the idealised flow path designed. The ridges also give physical support to the chromatographic media under flow in both directions.

By providing the ridges spaced no more than 5 mm apart, the ridges help to keep the channel open and uniform adjacent to the adsorbent chromatography medium. The ridges reduce the available space for mixing and turbulent flow, thereby reducing mixing between pulses of liquid. This increases resolution, reduces required pulse volumes, increases capacity and increases concentration of target species leaving the chromatography system.

According to an embodiment of the present invention, there is provided a chromatography system for radial flow chromatography comprising:
an inlet;
a cylindrically-shaped adsorbent chromatography medium downstream of the inlet;
an outlet downstream of the adsorbent chromatography medium; and
at least one of:
an upstream flow guide downstream of the inlet and upstream of the adsorbent chromatography medium and configured to distribute a flow of a liquid around the adsorbent chromatography medium; and a downstream flow guide downstream of the adsorbent chromatography medium and upstream of the outlet;

wherein at least one of the upstream flow guide and the downstream flow guide is shaped as a convex dome;

wherein at least one of a surface of the upstream flow guide and a surface of the downstream flow guide comprises ridges extending in a downstream direction.

At the inlet and/or outlet the unique geometry of the domed features ensures a smooth and even expansion/contraction of volume and so the acceleration/deceleration event that accompanies it. This reduces the likelihood of mixing of the incoming pulse and aids in the representation of a homogenous front to the upstream annulus and subsequent collection of the flow from the downstream annulus.

The convex domes take up dead space in the chromatography system and make the volume expansion of the flow path and directional changes (i.e. fewer sharp corners) through the chromatography system smoother. This helps to reduce undesirable turbulent flow, flow separation and mixing. In turn, this improves resolution, required pulse volumes, capacity and concentration of target species leaving the chromatography system by reducing mixing between pulses of liquid and improving distribution across the chromatography media.

According to an embodiment of the present invention, there is provided a chromatography system for at least one of tangential flow chromatography and lateral flow chromatography comprising:
an inlet;
a functionalised adsorbent chromatography medium downstream of the inlet;
an outlet downstream of the adsorbent chromatography medium; and
a flow guide downstream of the inlet and upstream of the adsorbent chromatography medium and configured to distribute a flow of a liquid from the inlet across a width of the adsorbent chromatography medium;
wherein the flow guide comprises a pattern of channels providing flow paths from the inlet to different parts of the adsorbent chromatography medium along the width of the adsorbent chromatography medium, wherein the pattern of channels is provided so as to reduce a difference in arrival time and/or flow velocity of liquid reaching the adsorbent chromatography medium across the width of the adsorbent chromatography medium.

By reducing the difference in arrival time and/or flow velocity, the lag between the start of a pulse and the end of a pulse of liquid in the chromatography system is reduced. This reduces mixing between pulses and improves distribution across the chromatography media, thereby increasing resolution, reducing required pulse volume, increasing capacity and increasing concentration of target species leaving the chromatography system.

According to an embodiment of the present invention, there is provided a method of manufacturing a chromatography system for radial flow chromatography, the method comprising:
attaching a cylindrically-shaped functionalised adsorbent chromatography medium to a convex dome-shaped flow guide;
positioning the adsorbent chromatography medium axially within a cylindrically-shaped channel member such that the flow guide protrudes from an open end of the channel member; and joining a cap to the open end of the channel member, wherein the cap has an inner surface shape corresponding to the convex dome-shaped flow guide;
wherein a medium-facing surface of the channel member comprises ridges for centring the adsorbent chromatography medium within the channel member.

The ridges can be used as locating features so that the cap can be positioned more precisely relative to the flow guide. This reduces the manufacturing tolerances, allowing the channel between the cap and the flow guide to be made smaller. The smaller channel means that flow through the chromatography system can be closer to plug flow, thereby decreasing mixing between successive pulses of liquid. In turn, this improves the resolution, required pulse volume, capacity and concentration of target species leaving the chromatography system.

According to an embodiment of the present invention, there is provided a method of performing tangential flow filtration and at least one of tangential flow chromatography and lateral flow chromatography (which can also be described as cross flow chromatography) comprising:
providing a chromatography system according to an embodiment of the present invention;
providing a flow comprising a suspension of material through the inlet to the adsorbent chromatography medium;
recirculating the flow comprising the suspension of material through the recirculation loop including the inlet to the adsorbent chromatography medium; and
providing a flow comprising at least one of a buffer and a cleaning agent through a backflow inlet on the same side of the adsorbent chromatography medium as the outlet and back through the adsorbent chromatography medium.

The chromatography system can be used for both filtration and for chromatography. This means that only one system is required instead of two, thereby reducing the cost of performing the processes.

According to an embodiment of the present invention, there is provided a chromatography system for radial flow chromatography comprising:
a cylindrically-shaped functionalised adsorbent chromatography medium attached to a convex dome-shaped flow guide;
a cylindrically-shaped channel member within which the adsorbent chromatography medium is axially positioned such that the flow guide extends beyond an end of the channel member; and
a cap joined to said end of the channel member, wherein the cap has an inner surface shape corresponding to the convex dome-shaped flow guide;
wherein a medium-facing surface of the channel member comprises ridges for centring the adsorbent chromatography medium within the channel member.

According to an embodiment of the present invention, there is provided a process for isolating one or more biological molecules from a mobile phase using the chromatography system of an embodiment of the present invention, wherein the process comprises contacting one or more biological molecules in a mobile phase with the adsorbent chromatography medium.

DETAILED DESCRIPTION OF THE INVENTION

Figure 1:
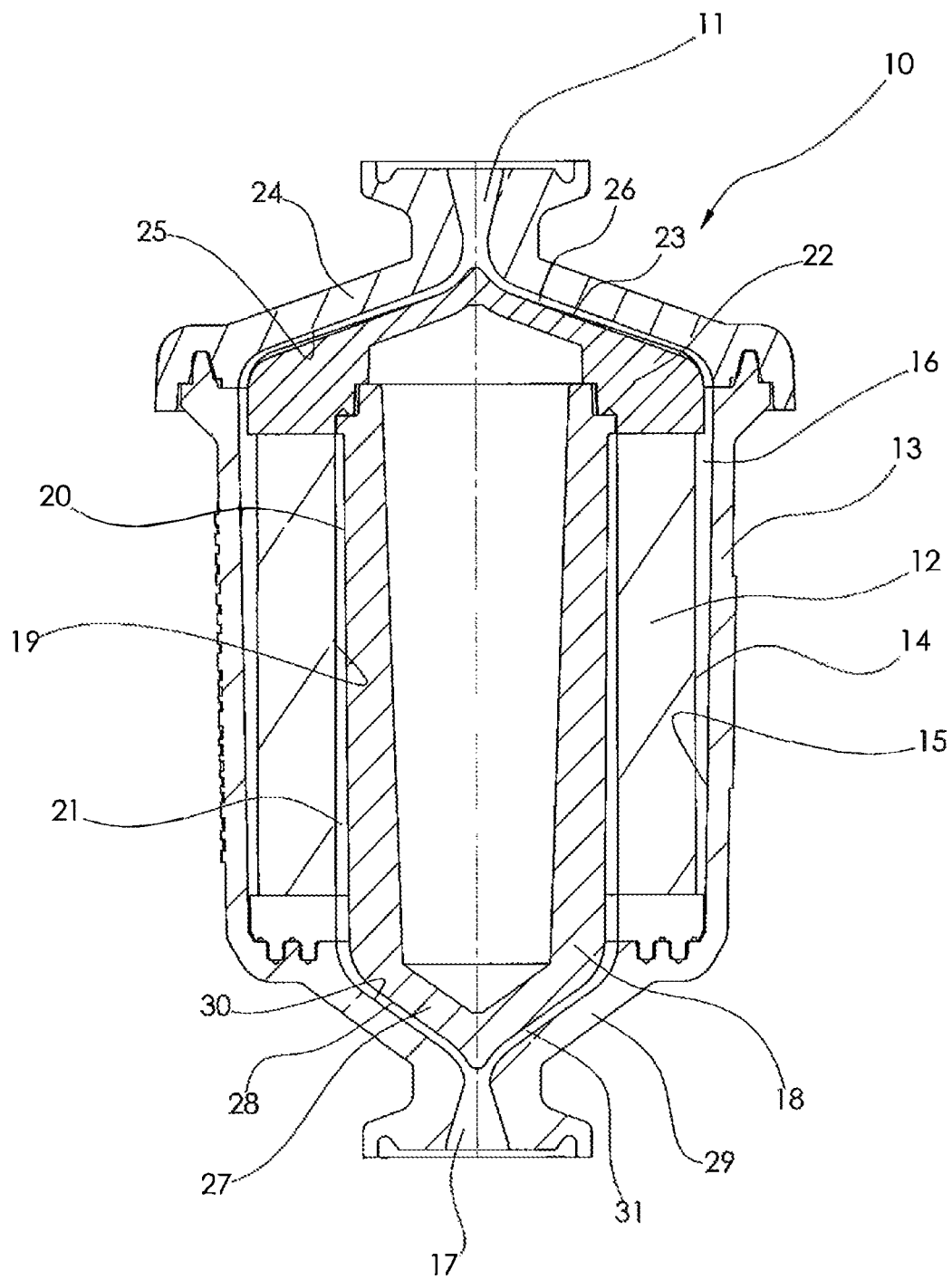
FIG. 1 shows a cross-sectional view of a chromatography system according to an embodiment of the present invention.

FIG. 1 is a schematic diagram of a chromatography system 10 according to an embodiment of the present invention. FIG. 1 is a cross-sectional view of the chromatography system 10. The chromatography system 10 may be called a chromatographic unit or a chromatography cartridge, for example.

As depicted in FIG. 1, the chromatography system 10 comprises an inlet 11. The inlet 11 is the entry point for fluids (such as buffers, suspensions or solutions comprising proteins, for example) into the chromatography system 10. In use, the chromatography system 10 may be oriented opposite to the orientation shown in FIG. 1, namely with the inlet 11 at the bottom of the chromatography system 10. Pulses of liquid are pumped upwards through the inlet 11. This orientation has advantages of removing trapped air from the chromatography system 10, as explained below. Alternatively, the chromatography system 10 may be oriented as shown in FIG. 1, namely with the inlet 11 at the top of the chromatography system 10. Pulses of liquid may be pumped downwards through the inlet 11.

Optionally, the adsorbent chromatography medium 12 is impermeable to air. In use, air can get trapped in the chromatography system 10. This could be air buildup due to de-gassing of the buffers due to pressure drops. Orienting the chromatography system 10 with the inlet 11 at the bottom means that any air can get trapped in the outer annulus (i.e. the upstream channel 16 of the chromatography system shown in FIG. 1 or the downstream channel 21 of the chromatography system shown in FIG. 6). Optionally, the chromatography system 10 comprises a vent in the channel member that surrounds the adsorbent chromatography medium 12. The vent (not shown in the Figures) is configured to allow for the release of air through the vent. The vent extends through the outer housing member (i.e. the channel member that surrounds the adsorbent chromatography medium 12). Optionally the vent comprises an aperture through the channel member for fluidly communicating the ambient environment to the channel between the adsorbent chromatography medium 12 and the channel member. Optionally the vent comprises a valve.

Optionally, the vent is controllable such that air can be released when desired. For example, optionally the vent can be opened and closed. The opening and closing of the vent may be performed manually or automatically. Optionally, the chromatography system 10 comprises only a single vent for releasing trapped air.

Optionally, the chromatography system 10 comprises an automatic venting system comprising the vent. In an embodiment, the venting system is configured to remove air through the vent (e.g. by opening the vent) at regular time intervals automatically during use of the chromatography system. In an alternative embodiment, the venting system comprises a trigger that can be manually operated. When the trigger is operated, the venting system is configured to remove air through the vent. In another alternative embodiment, the venting system is configured to remove air through the vent in response to a trigger event. For example the trigger event may be a pressure change before, after, across, or within the chromatography system 10 reaching a threshold pressure value or a property of a liquid matching a predetermined condition. When the pressure is used as the trigger event, the chromatography system 10 may comprise a pressure sensor configured to sense the pressure inside the upstream channel 16 or downstream channel 21, e.g. adjacent to the vent. Optionally, a pressure sensor is provided in a pipe connected to the inlet 11 and/or outlet 17 for measuring the pressure upstream of the inlet 11 and/or downstream of the outlet 17.

Alternately the trigger event could be a signal produced from light absorbance measurements of the liquid leaving or entering the unit. For example, the predetermined condition may be that the trace of the absorbance for the liquid exiting the chromatography system 10 being below a predetermined value of area or geometry. Optionally, a UV monitor is provided for measuring light absorbance of the liquid leaving or entering the unit.

Alternately the trigger event could be a specific time or step of a protocol. For example during wash stages.

Figure 6:
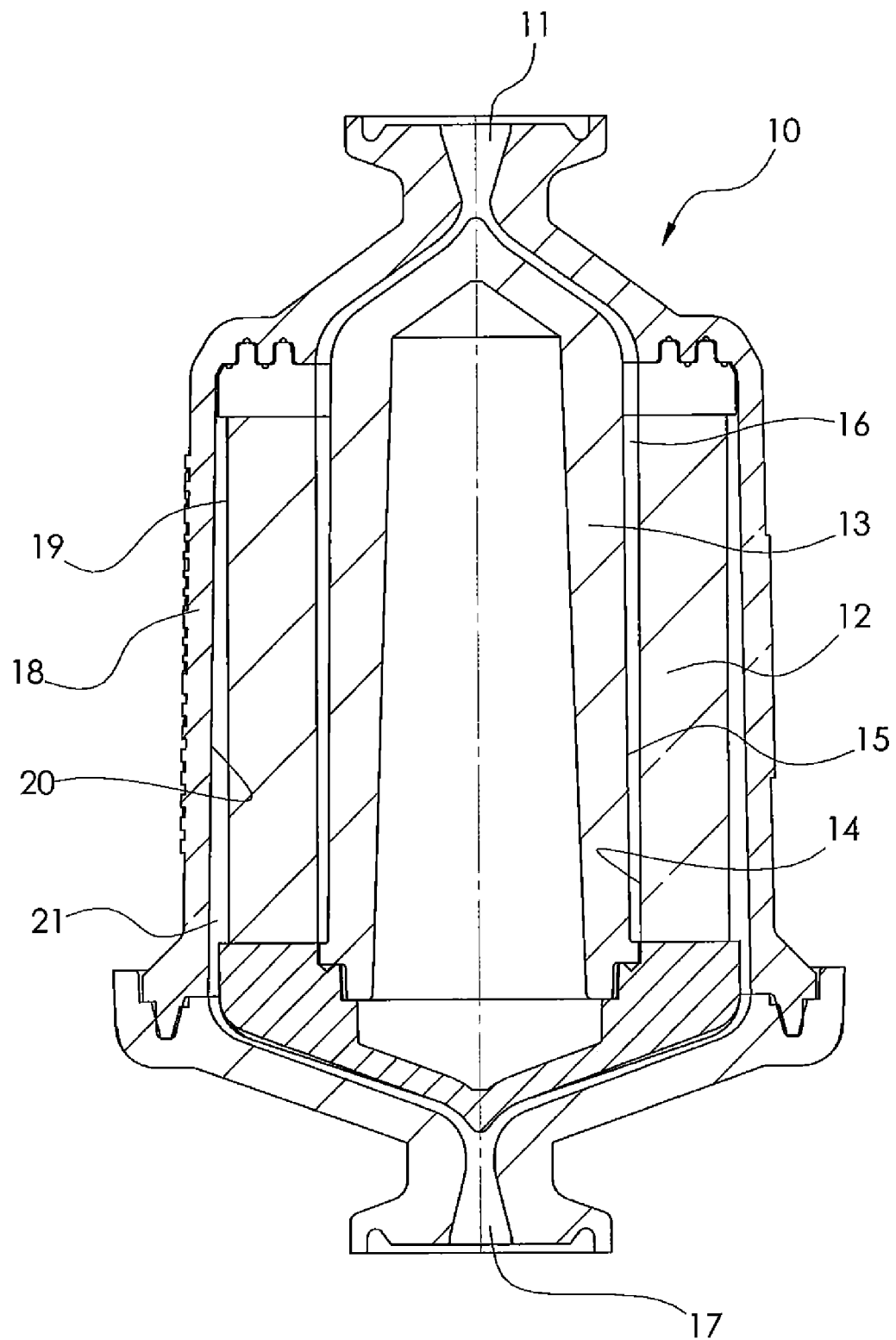
FIG. 6 is a cross-sectional view of a chromatography system according to an embodiment of the present invention.

As mentioned above, in an alternative embodiment the chromatography system 10 of FIG. 1 is operated in the orientation with the inlet 11 at the top, and the chromatography system 10 of FIG. 6 may be operated with the outlet 17 at the top. However, with such an orientation, there is a greater possibility of air getting trapped at the top of the inner annulus (i.e. the downstream channel 21 shown in FIG. 1 or the upstream channel 16 shown in FIG. 6). The inner annulus is less accessible than the outer annulus, making it more difficult to remove the trapped air.

As depicted in FIG. 1, the chromatography system 10 comprises a functionalised adsorbent chromatography medium 12. The adsorbent chromatography medium 12 is positioned downstream of the inlet 11. This means that when a liquid enters into the chromatography system 10, the liquid flows from the inlet 11 to the adsorbent chromatography medium 12.

The adsorbent chromatography medium 12 comprises an upstream surface 14 and a downstream surface 19. When liquid enters into the chromatography system 10, liquid flows from the inlet 11 to the upstream surface 14 of the adsorbent chromatography medium 12, through the adsorbent chromatography medium 12 and out of the adsorbent chromatography medium 12 via the downstream surface 19 of the adsorbent chromatography medium 12.

As depicted in FIG. 1, in an embodiment the chromatography system 10 comprises an upstream channel member 13. The upstream channel member 13 is arranged relative to the adsorbent chromatography medium 12 such that an upstream surface 14 of the adsorbent chromatography medium 12 and a medium-facing surface 15 of the upstream channel member 13 form an upstream channel 16. A flow of liquid flows through the upstream channel 16 from the inlet 11 into the adsorbent chromatography medium 12.

As shown in FIG. 1, the upstream channel 16 runs along the upstream surface 14 of the adsorbent chromatography medium 12. The upstream channel 16 is adjacent to the upstream surface 14 of the adsorbent chromatography medium 12. In the arrangement show in FIG. 1, the adsorbent chromatography medium 12 is cylindrically-shaped and the upstream channel 16 has a cross-section that is shaped as an annulus. However, this is not necessarily the case. In another arrangements, the adsorbent chromatography medium 12 may be planar and the upstream channel 16 may also be substantially planar. These alternative arrangements will be described in more detail below (e.g. in relation to FIG. 7).

As depicted in FIG. 1, the chromatography system 10 comprises an outlet 17. The outlet 17 is downstream of the adsorbent chromatography medium 12. This means that when liquid flows through the chromatography system 10, the liquid flows from the adsorbent chromatography medium 12 to the outlet 17. The outlet 17 is the point at which liquid exits the chromatography system 10.

As shown in FIG. 1, optionally the inlet 11 and the outlet 17 are shaped such that they have a cross-section that increases towards the outside of the chromatography system 10. However, this is not necessarily the case. For example, the cross-section of the inlet 11 and the outlet 17 may be substantially constant or the cross-section may decrease in size towards the outside of the chromatography system 10.

The upstream channel 16 has a cross-sectional area. The cross-sectional area is the area of the upstream channel 16 in a cross-section perpendicular to the downstream direction of the chromatography system 10. The downstream direction of the chromatography system 10 is the direction from the inlet 11 to the outlet 17. In the example shown in FIG. 1, the cross-sectional area of the upstream channel 16 is shaped as an annulus. In an alternative construction in which the adsorbent chromatography medium 12 is planar, the cross-sectional area of the upstream channel 16 is rectangular.

In the embodiment depicted in FIG. 1, the cross-sectional area of the upstream channel 16 decreases away from the inlet 11. This can be seen in FIG. 1, in which the upstream surface 14 of the adsorbent chromatography medium 12 is vertical in the drawing, whereas the medium-facing surface 15 of the upstream channel member 13 is angled slightly towards the adsorbent chromatography medium 12 in the downstream direction. In FIG. 1, the downstream direction is the downwards direction.

Figure 2:
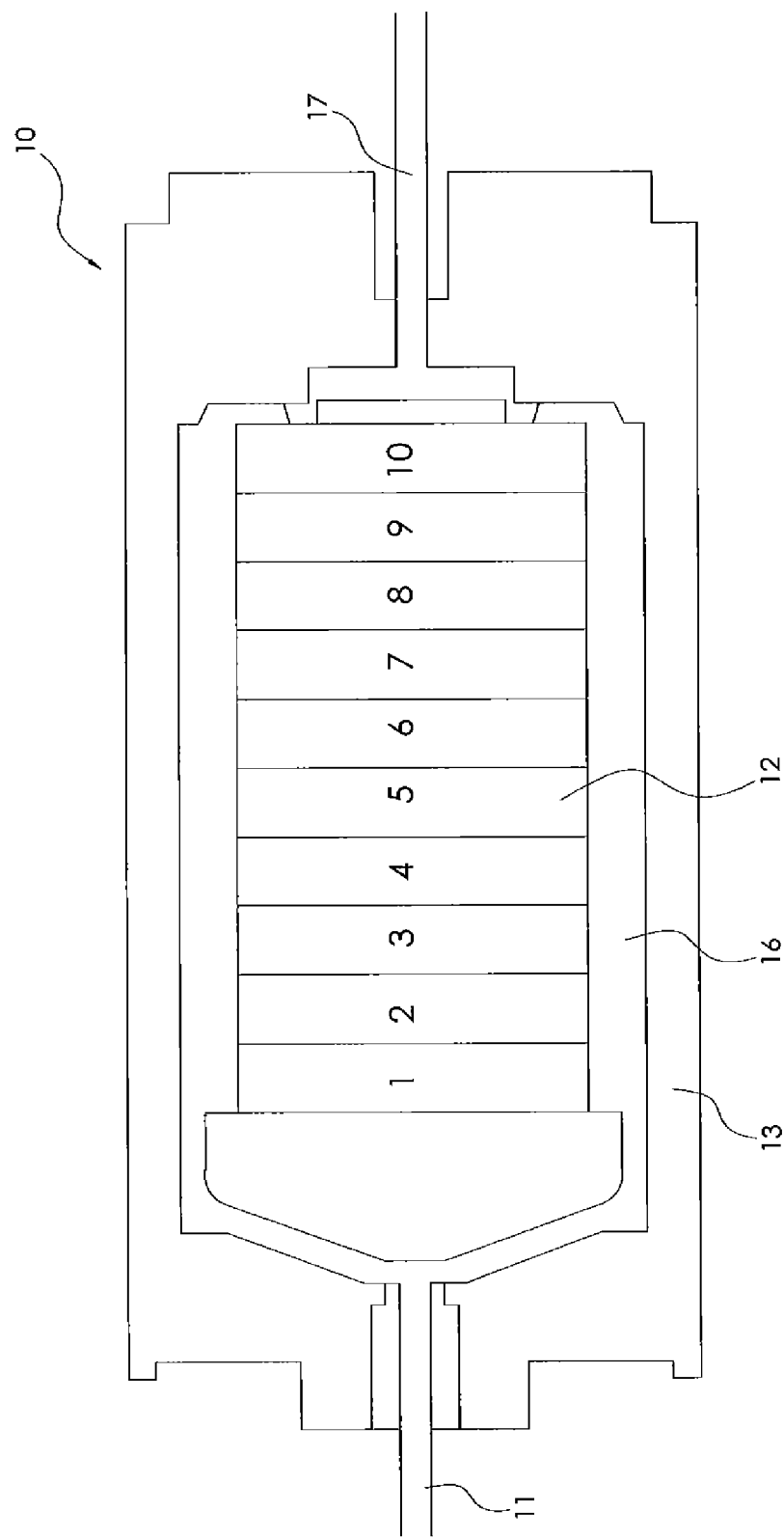
FIG. 2 schematically shows different regions of the chromatography medium.

By providing that the cross-sectional area of the upstream channel 16 decreases away from the inlet 11, the average reagent concentration of the filter (i.e. the adsorbent chromatography medium 12) increases. This is shown is FIGS. 2 to 4. FIG. 2 is a schematic diagram showing different regions of the adsorbent chromatography medium 12. The different regions are numbered from 1 to 10, with 1 being the region closest to the inlet 11 and 10 being the region furthest from the inlet 11 and closest to the outlet 17.

Figure 3:
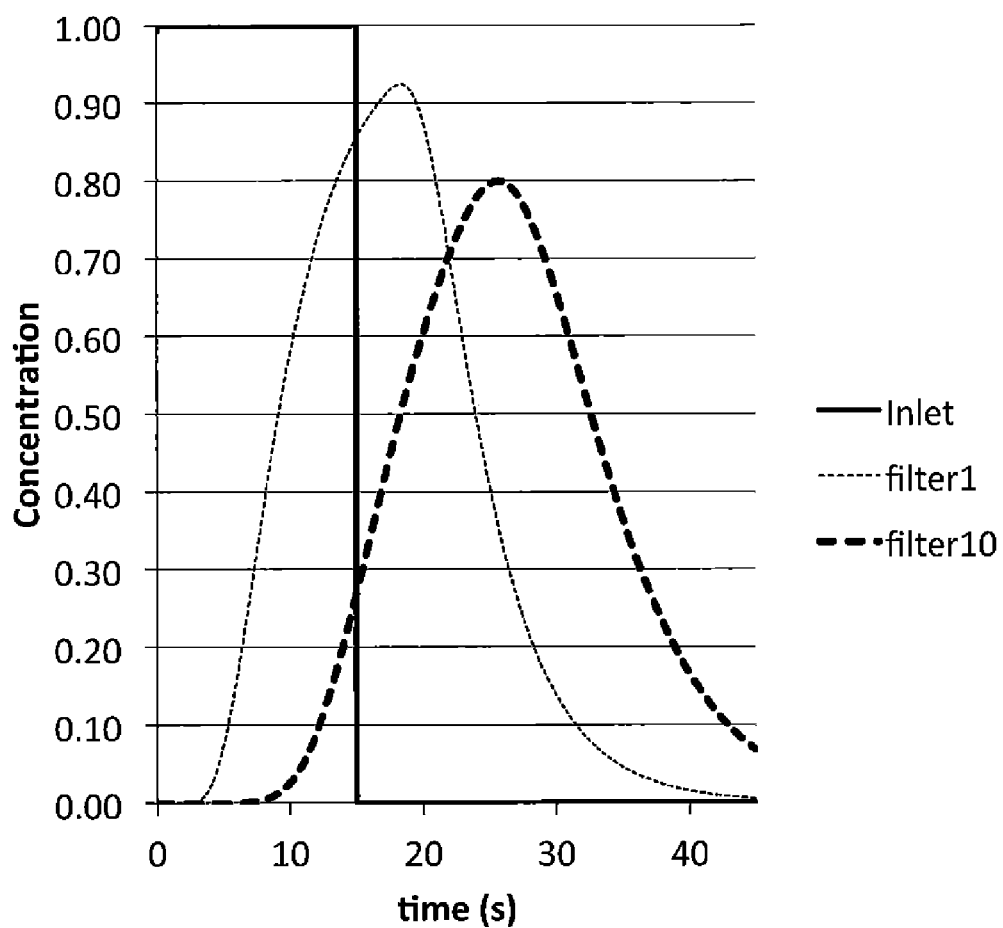
FIG. 3 is a graph showing the relationship between time and reagent concentration at the inlet and different regions of the chromatography medium according to a comparative example.

FIG. 3 is a graph showing the relationship between time and reagent concentration for the inlet 11 and different regions of the adsorbent chromatography medium 12, specifically the region closest to the inlet 11 and the region closest to the outlet 17. FIG. 3 is for a comparative example in which the cross-sectional area of the upstream channel 16 remains constant (rather than decreasing away from the inlet 11). When a substance or a mixture comprising reagents is entered into the chromatography system 10, reagents bind to the adsorbent chromatography medium 12.

When the substance or mixture flows from the inlet 11 and through the upstream channel 16, the substance or mixture reaches the different regions of the adsorbent chromatography medium 12 in order from 1 to 10. The substance or mixture reaches region 1 first and reaches region 10 last. As a result, the variation of reagent concentration over time is different for the different regions of the adsorbent chromatography medium 12.

In particular, as shown in FIG. 3 the region that is closest to the inlet 11 generally has a higher peak reagent concentration value and reaches that peak concentration value earlier. This is because the regions of the adsorbent chromatography medium 12 that are further from the inlet 11 are exposed to the flow of the substance or mixture at a later time. This can cause peak spreading, i.e. the lengthening of the time delay between the start of the pulse and the end of the pulse as the pulse passes through the chromatography system 10. Peak spreading is undesirable because it encourages mixing of different pulses of liquid applied to the chromatography system 10.

In an ideal situation, the flow of liquid through the chromatography system 10 would be plug flow. In plug flow, the velocity of the fluid is assumed to be constant across the cross-section of the channels perpendicular to the axis of the channels. Plug flow assumes that there is no boundary layer adjacent to the inner wall of the channels. Of course, in reality perfect plug flow is not achievable. In particular, in practice the velocity of the fluid varies across the cross-section of the channels of the chromatography system 10, resulting in peak spreading. The more peak spreading there is, the greater possibility there is for sequential pulses of fluid to mix with each other. This mixing is undesirable.

Figure 4:
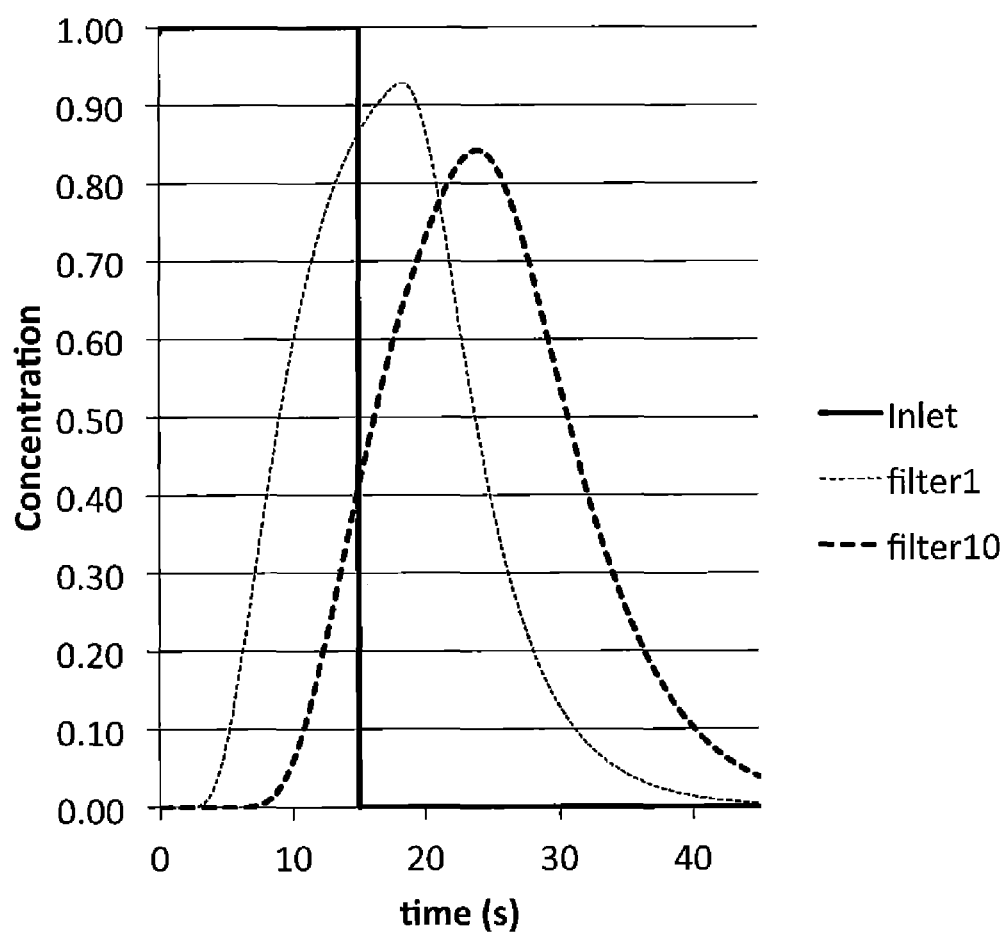
FIG. 4 is a graph showing the relationship between time and concentration for the inlet and different regions of the chromatography medium according to an embodiment of the present invention.

Meanwhile, FIG. 4 is a graph showing the relationship between time and reagent concentration for the inlet 11 and different regions of the adsorbent chromatography medium 12, specifically the region closest to the inlet 11 and the region closest to the outlet 17. FIG. 4 is according to an embodiment of the present invention in which the cross-sectional area of the upstream channel 16 decreases away from the inlet 11. The effect of providing that the cross-sectional area of the upstream channel 16 decreases away from the inlet 11 can be seen from a comparison between FIG. 3 and FIG. 4. In particular, the peak reagent concentration at the adsorbent chromatography medium 12 is increased. Furthermore, the time lag from when the region of the adsorbent chromatography medium 12 closest to the inlet 11 reaches its peak reagent concentration and when the region closest to the outlet 17 reaches its peak reagent concentration is decreased. Hence, peak spreading is reduced, such that the possibility of mixing between different pulses of liquid is reduced. This increases the resolution, reduces the required pulse volume, increases capacity and increases concentration of target species leaving the chromatography system 10.

The results shown in FIG. 3 and FIG. 4 were produced through a computational simulation. A filter (i.e. adsorbent chromatography medium 12) geometry was modeled at 400 mL/min, with the flow rate being solved using a two-stage process. Firstly the steady flow field was calculated, followed by a species transport calculation where the reagent fluid is introduced at the inlet 11 and its concentration throughout the chromatography system 10 is determined over a period until the concentration at the outlet stabilizes.

The Computational Fluid Dynamics (CPD) flowfield was calculated assuming steady, incompressible flow with properties of water at room temperature. Reynolds number is therefore low and so the flow modelled as laminar A transient scalar transport calculation, based on the steady flow field, was used to solve the concentration of the introduced reagent fluid. The properties of the reagent fluid were assumed to be identical to water.

The introduction of the reagent fluid was modelled as a step change of the concentration at the inlet from 0 to 1. The regent liquid was added for 15 s with the simulation then run for an additional 30 s. The material of the adsorbent chromatography medium 12 was split into 10 equal parts (as shown in FIG. 2) and the concentration of reagent liquid as a function of time measured (as shown in FIG. 3 and FIG. 4 for different constructions of chromatography system 10).

The concentration of reagent liquid within the different filter sections varies with their location. The part of the filter close to the inlet 11 sees a quick increase and decrease of the concentration.

An adsorbent material has only a finite capacity or concentration at which it can bind. Thus this model demonstrates that the filter sections closest to the inlet could exceed their capacity and allow the target to breakthrough before the latter sections of the filter were saturated. This leads to an underutilisation of the adsorbent material as to avoid product loss and low yields of the binding step the process is stopped before there is significant product breakthrough.

The amount of reagent liquid passing through each section of the filter can be defined as exposure (integration of concentration history over time). The profiles of the first five sections of the filter are very uniform and so have a similar average exposure. However the sections with the longer flow paths are exposed to less reagent.

In both the inlet 11 and/or outlet 17 and across the channels that are adjacent to the adsorbent chromatography medium 12 in tangential/lateral flow units there is a wide distribution in path lengths. Therefore if the velocity is kept constant across all path lengths any pulse administered will be spread out and the residence time will be different.

By sloping the channels 16, 21 i.e. having a different area of the cross section as it progresses either towards or away from the inlet 11 or outlet 17, flow can be sped up or slowed down to account for differences in flow path length. Such feats can be achieved in the inlet 11 and/or outlet 17 as flow expands from a narrow cross sectional area and expanded to be represented to the edge of the chromatographic medium 12 which represents a wider cross sectional area/width. The impact of creating this velocity distribution is to even out the exposure of the pulse to the chromatographic medium 12 and so create a tighter distribution of residence times within the chromatography system 10.

In the embodiment shown in FIG. 1, the cross-sectional area of the upstream channel 16 decreases away from the inlet 11 by providing a draft angle θ between the upstream surface 14 of the adsorbent chromatography medium 12 and the medium-facing surface 15 of the upstream channel member 13. The introduction of the draft angle θ on the annulus that is the upstream channel 16 accelerates the flow of fluid to the sections of the adsorbent chromatography medium 12 that are furthest from the inlet 11. This acceleration means that there is a smaller time difference or time lag between when the different sections of the adsorbent chromatography medium 12 are exposed to the fluid. This increases the effective capacity of the chromatography system 10 and improves resolution, buffer usage and target species concentration due to an ability to be closer to the ideal type of flow which is plug flow. This is because the greater the time difference between the different sections of the adsorbent chromatography medium 12 being exposed to the fluid, the more likely that the input of fluid will have to be stopped before later sections of the adsorbent chromatography medium 12 have been significantly exposed to the fluid. Hence, providing that the upstream channel 16 has a reduced area in its downstream end provides technical advantages over previously known chromatography systems.

Figure 5:
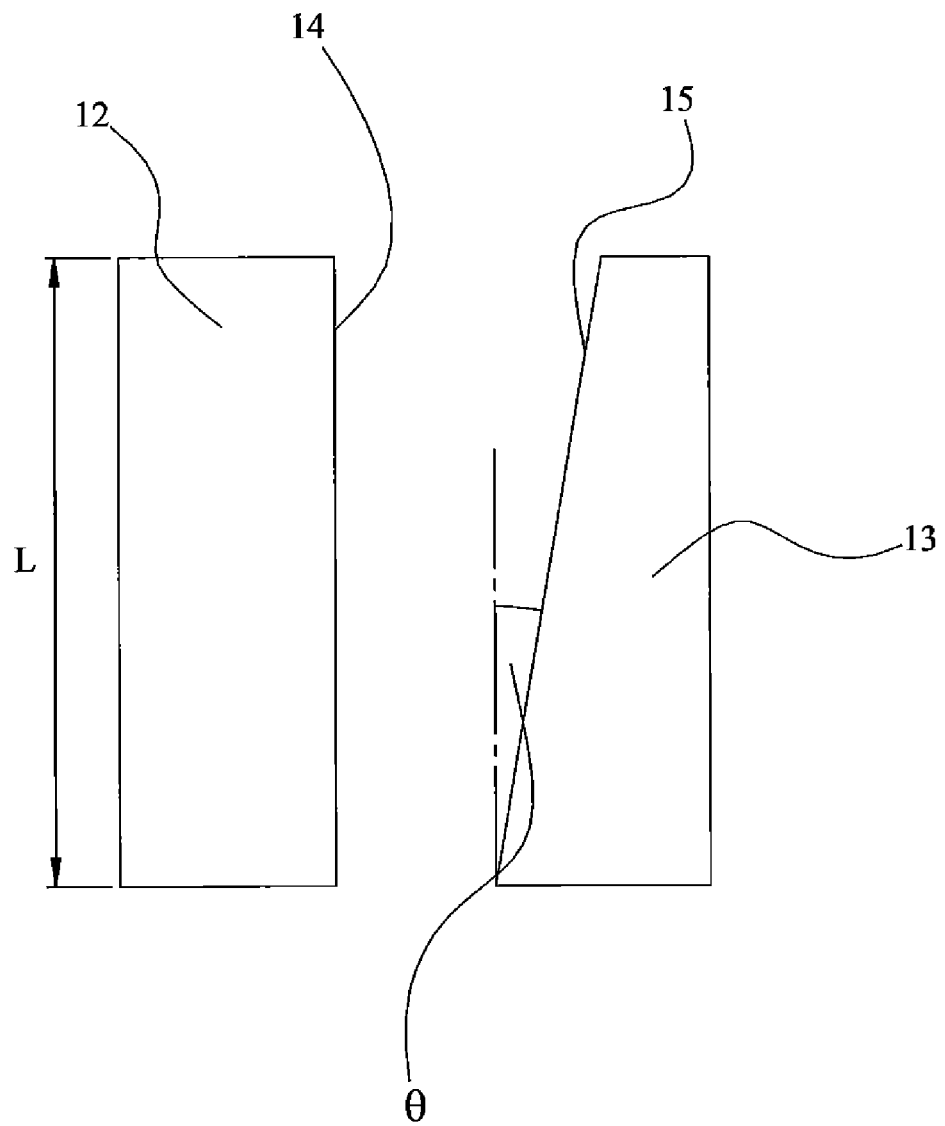
FIG. 5 schematically shows a draft angle between the chromatography medium and a channel member of a chromatography system according to an embodiment of the present invention.

The chromatography system 10 of the present invention can come in various different sizes. In particular, the adsorbent chromatography medium 12 can come in various different lengths. FIG. 5 is a schematic diagram illustrating the draft angle θ between the adsorbent chromatography medium 12 and the upstream channel member 13. In FIG. 5, the upstream surface 14 of the adsorbent chromatography medium 12 is vertical. The dashed line in FIG. 5 is also vertical, i.e. parallel to the upstream surface 14 of the adsorbent chromatography medium 12. The medium-facing surface 15 of the upstream channel member 13 makes a draft angle θ to the upstream surface 14 of the adsorbent chromatography medium 12.

As shown in FIGS. 1 and 5, the cross-sectional area of the upstream channel 16 may gradually and consistently decrease away from the inlet 11. However, this may not necessarily be the case. The decrease in cross-sectional area of the upstream channel 16 may comprise one or more step changes.

The length L of the adsorbent chromatography medium 12 is also shown in FIG. 5. The draft angle θ means that the gap (i.e. the width of the upstream channel 16) between the adsorbent chromatography medium 12 and the upstream channel member 13 increases towards the upstream end of the upstream channel 16. The longer the adsorbent chromatography medium 12, the greater the width of the upstream channel 16 at its upstream end for a given draft angle θ.

It may be undesirable to have larger distances between the adsorbent chromatography medium 12 and upstream housing member 13. This is because when the upstream channel 16 is wide, this provides greater opportunity for turbulent flow, flow separation and mixing. This can undesirably decrease the effective capacity of the chromatography system 10 in dealing with successive pulses of a substance or mixture.

In an embodiment, the draft angle θ is smaller for greater values of the length L of the adsorbent chromatography medium 12. This is to limit the cross-sectional area of the upstream channel 16, particularly at the upstream end of the upstream channel 16. This reduces the available space for turbulent flow, flow separation and mixing. For example, in an embodiment the following equation linking the draft angle θ (in degrees) and the length L (in mm) of the adsorbent chromatography medium is satisfied: $\theta=-aL+b$, where a is coefficient in the range from 0.001 to 0.01, and where b is a constant. When a is at least 0.001 and less than 0.004, then $b=1559a-1.3$. When a is at least 0.004 and at most 0.01, then $b=50a+5$. Merely as an example, when the length L is less than about 200 mm, then a may be at least 0.001 and less than 0.004. When the length L is at least about 200 mm, then a may be a at least 0.004 and at most 0.01. This means that, for example, if the length L of the adsorbent chromatography medium 12 is 100 mm and the coefficient a is 0.002, then the draft angle $\theta=-0.002 L+1.818=1.418°$. If the length L of the adsorbent chromatography medium 12 is 400 mm and the coefficient a is 0.007, then the draft angle $\theta=-0.007 L+5.35=2.55°$.

In an embodiment the product of the draft angle θ and the length L of the adsorbent chromatography medium is less than or equal to 1000 mm. This means that, for example, if the length L of the adsorbent chromatography medium 12 is 1000 mm, then the draft angle θ has a maximum value of 1°. If the length L of the adsorbent chromatography medium 12 is 500 mm, then the draft angle θ has a maximum value of 2°. If the length L of the adsorbent chromatography medium 12 is 50 mm, then the draft angle θ has a maximum value of 10°.

The value of the draft angle θ is not particularly limited. The greater the draft angle θ, the greater the effect of speeding up the flow of fluid towards the regions of the adsorbent chromatography medium 12 that are further from the inlet 11. In an embodiment, the draft angle θ formed between the upstream surface 14 of the adsorbent chromatography medium 12 and the medium-facing surface 15 of the upstream channel member 13 in the longitudinal direction of the chromatography system 10 is at least about 0.5°, at least about 1°, at least about 2° or at least about 5°. Optionally, the draft angle θ has a value of at most about 10°, at most about 5°, at most about 2° or at most about 1°.

However, it is not necessary for the upstream channel 16 to have a draft angle θ. In an alternative embodiment, the cross-sectional area of the upstream channel 16 is substantially constant along the length of the adsorbent chromatography medium 12.

The length L of the adsorbent chromatography medium 12 is not particularly limited. For example, the adsorbent chromatography medium 12 may have a length L that is at least 10 mm, at least 50 mm, at least 100 mm, at least 500 mm, or at least 1000 mm, for example. The adsorbent chromatography medium 12 may have a length L that is at most 2000 mm, at most 1000 mm, at most 500 mm, at most 100 mm, or at most 50 mm, for example.

The lateral extent of the adsorbent chromatography medium 12 is not particularly limited. For example, the adsorbent chromatography medium 12 may have a lateral extent that is at least 10 mm, at least 50 mm, at least 100 mm, at least 500 mm, or at least 1000 mm, for example. The adsorbent chromatography medium 12 may have a lateral extent that is at most 2000 mm, at most 1000 mm, at most 500 mm, at most 100 mm, or at most 50 mm, for example.

As depicted in FIG. 1, in an embodiment the chromatography system 10 comprises a downstream channel member 18. The downstream channel member 18 is arranged relative to the adsorbent chromatography medium 12 such that the downstream surface 19 of the adsorbent chromatography medium 12 and a medium-facing surface 20 of the downstream channel member 18 form a downstream channel 21. A flow of a liquid flows through the downstream channel 21 from the adsorbent chromatography medium 12 towards the outlet 17.

In the arrangement shown in FIG. 1, the downstream channel 21 has a cross-sectional area in the shape of an annulus. In alternative arrangements in which the adsorbent chromatography medium 12 is planar, the downstream channel 21 may have a cross-sectional area that is rectangular.

The downstream channel 21 is adjacent to the adsorbent chromatography medium 12. The downstream channel 21 extends along the downstream surface 19 of the adsorbent chromatography medium 12.

Optionally, the downstream channel 21 has no draft angle. This means that the downstream surface 19 of the adsorbent chromatography medium 12 is substantially parallel to the medium-facing surface 20 of the downstream channel member 18 in the longitudinal direction (i.e. the downstream direction) of the chromatography system 10. The cross-sectional area of the downstream channel 21 is substantially constant along the length of the adsorbent chromatography medium 12.

In an alternative embodiment, the cross-sectional area of the downstream channel 21 increases towards to the outlet 17. This is shown in the arrangement in FIG. 1, in which the medium-facing surface 20 of the downstream channel member 18 tends slightly away from the adsorbent chromatography medium 12 in the downward direction in FIG. 1.

By providing that the cross-sectional area of the downstream channel 21 increases towards the outlet 17, the chromatography system 10 can be used with the opposite flow direction whilst still benefiting from the draft angle accelerating the flow towards the further regions of the adsorbent chromatography medium 12.

In particular, FIG. 6 shows a cross-sectional view of a chromatography system 10 according to an embodiment of the present invention. The arrangement shown in FIG. 6 corresponds to the same construction as shown in FIG. 1, but with the opposite orientation. As a result, the outlet 17 shown in FIG. 1 corresponds to the inlet 11 shown in FIG. 6. Similarly, the downstream channel member 18, the upstream channel member 13 and the inlet 11 shown in FIG. 1 corresponds to the upstream channel member 13, the downstream channel member 18 and the outlet 17, respectively, shown in the arrangement of FIG. 6. The cross-sectional area of the upstream channel 16 shown in the arrangement in FIG. 6 decreases away from the inlet 11.

Hence, in the arrangement shown in FIG. 1, by providing draft angles for both the upstream channel 16 and the downstream channel 21, the chromatography system 10 can be used by flowing liquid in either direction while still benefiting from the draft angle in whichever channel is the upstream channel 16 (which depends on the flow direction).

In a further alternative embodiment, the cross-sectional area of the downstream channel 21 decreases towards the outlet 17. By providing that the cross-sectional area of the downstream channel 21 decreases towards the outlet 17, the flow of fluid through the downstream channel 21 can be accelerated towards the outlet 17. This can have the desirable effect of reducing the lag time between fluid reaching the outlet 17 from different portions of the adsorbent chromatography medium 12.

Alternatively, by providing that there is no draft angle in the downstream channel 21, i.e. such that the cross-sectional area of the downstream channel 21 remains substantially constant, a good balance can be found between allowing for reversal of the flow direction in the chromatography system 10 and managing the lag time at the outlet 17 of the chromatography system 10.

Figure 7:
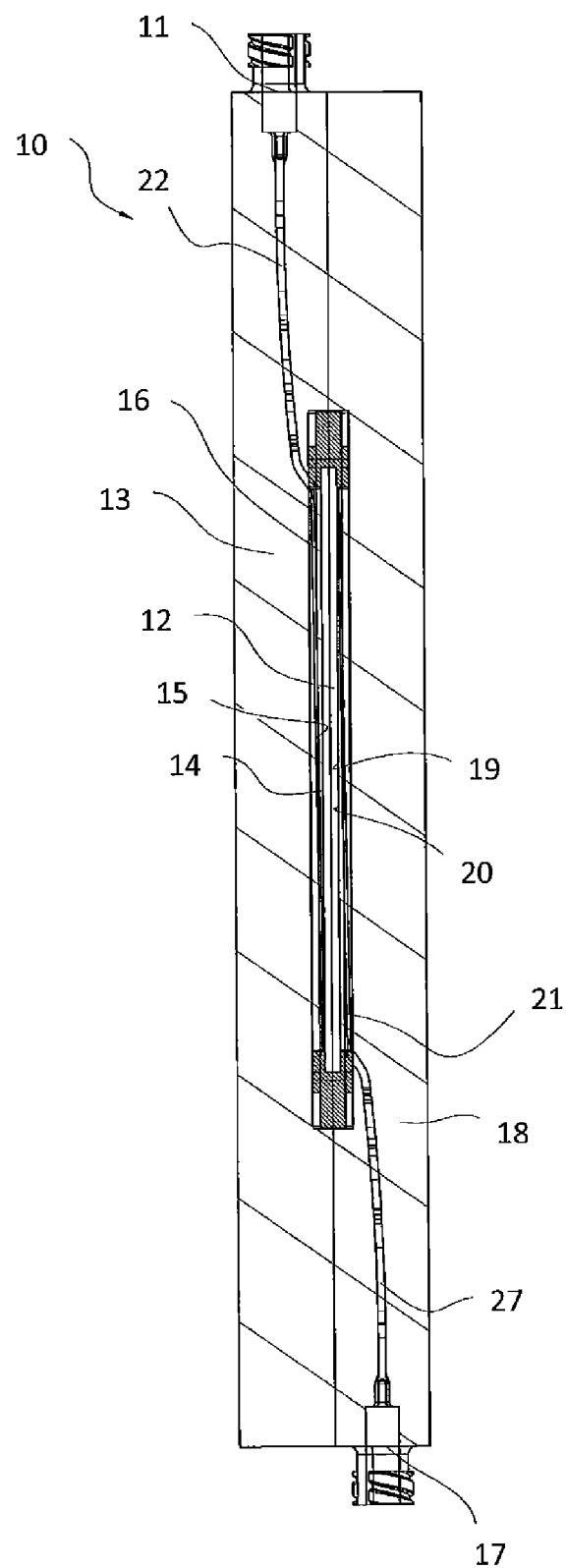
FIG. 7 is a cross-sectional view of a chromatography system according to an embodiment of the present invention.

FIG. 7 is a schematic diagram showing a cross-sectional view of the chromatography system 10 according to an embodiment of the present invention. FIG. 7 shows a chromatography system 10 for tangential flow chromatography or lateral flow chromatography. The adsorbent chromatography medium 12 is planar, arranged as a rectangle (or another two-dimensional shape) rather than the cylinder shown in FIGS. 1 and 6.

The upstream channel 16 and the downstream channel 21 have cross-sectional areas that are substantially rectangular. This is in contrast to the chromatography system 10 for radial flow chromatography depicted FIGS. 1 and 6. In the chromatography systems 10 for radial flow chromatography, the adsorbent chromatography medium 12 is cylindrical and the upstream channel 16 and the downstream channel 21 have cross-sectional areas that are in a shape of annuli.

In the arrangement shown in FIG. 7, both the upstream channel 16 and the downstream channel 21 have draft angles, such that their cross-sectional areas decrease away from the inlet 11 and outlet 17, respectively. However, it is not necessary for the upstream channel 16 or the downstream channel 21 to have a draft angle. In an alternative embodiment, the cross-sectional area of the upstream channel 16 and/or the downstream channel 21 is substantially constant along the length of the adsorbent chromatography medium 12.

The aspect ratio of the chromatography system 10 is a value indicating the relationship between the length L of the adsorbent chromatography medium 12 and the lateral extent (i.e. width) of the adsorbent chromatography medium 12. In a chromatography system 10 for radial flow chromatography, the lateral extent of the adsorbent chromatography medium 12 corresponds to the diameter of the adsorbent chromatography medium 12, measured from the outer surface of the adsorbent chromatography medium 12 on opposites sides of it. In a chromatography system 10 for tangential flow chromatography or lateral flow chromatography, the lateral extent of the adsorbent chromatography medium 12 corresponds to its width.

The aspect ratio is defined as the length L of the adsorbent chromatography medium 12 divided by its lateral extent. The aspect ratio of the chromatography system 10 is not particularly limited.

The aspect ratio may be at least 0.5, at least 1, at least 5 or at least 10, for example. The aspect ratio may be at most 10, at most 5, at most 2 or at most 1, for example.

A smaller aspect ratio (e.g. a shorter and fatter chromatography system for radial flow chromatography) is expected to result in higher peak concentrations for the different regions of the adsorbent chromatography medium 12. This is because of the smaller lag time between different portions of the adsorbent chromatography medium 12 being exposed to a substance or mixture flowing through the chromatography system 10.

A greater aspect ratio (e.g. a longer and thinner chromatography system for radial flow chromatography) is expected to result in improved distribution of the flow of liquid around the adsorbent chromatography medium 12. This is because the flow of liquid can be more easily controlled to flow more evenly around the perimeter of the adsorbent chromatography medium 12 when the lateral extent of the chromatography medium is reduced.

Figure 8:
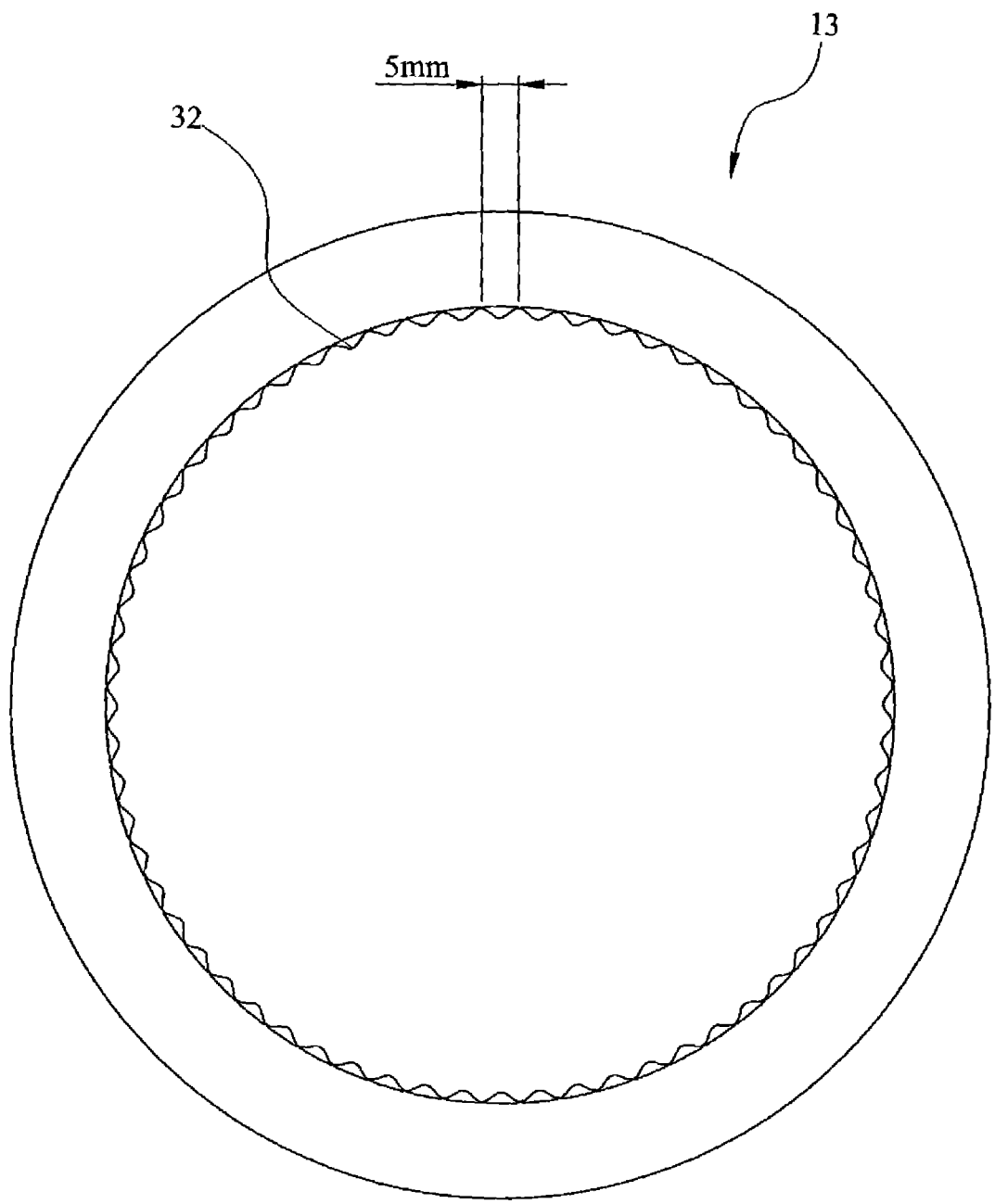
FIG. 8 is a perspective view of part of a channel member according to an embodiment of the present invention.

FIG. 8 is a perspective view of part of an upstream channel member 13 of a chromatography system 10 according to an embodiment of the present invention. FIG. 8 is provided for describing ridges 32 on the medium-facing surface 15 of the channel member. These ridges 32 may be provided to the medium-facing surface of any channel member, e.g. the upstream channel member 13 or the downstream channel member 18 or both the upstream channel member 13 and the downstream channel member 18.

Each channel member 13, 18 is arranged relative to the adsorbent chromatography medium 12 such that a surface of the adsorbent chromatography medium 12 and a medium-facing surface of the channel member 13, 18 form a channel (i.e. the upstream channel 16 or the downstream channel 21) through which a flow of a liquid flows adjacent to the chromatography medium 12.

As shown in FIG. 8, in an embodiment the medium-facing surface 15 of the channel member 13 comprises ridges 32. The ridges 32 are spaced at most 5 mm apart and extend in a downstream direction of the chromatography system 10. In the example shown in FIG. 8, the channel member is an upstream channel member 13. In the example shown in FIG. 8, the ridges 32 are spaced 5 mm apart. The spacing is measured between adjacent peaks of the ridges 32.

Figure 9:
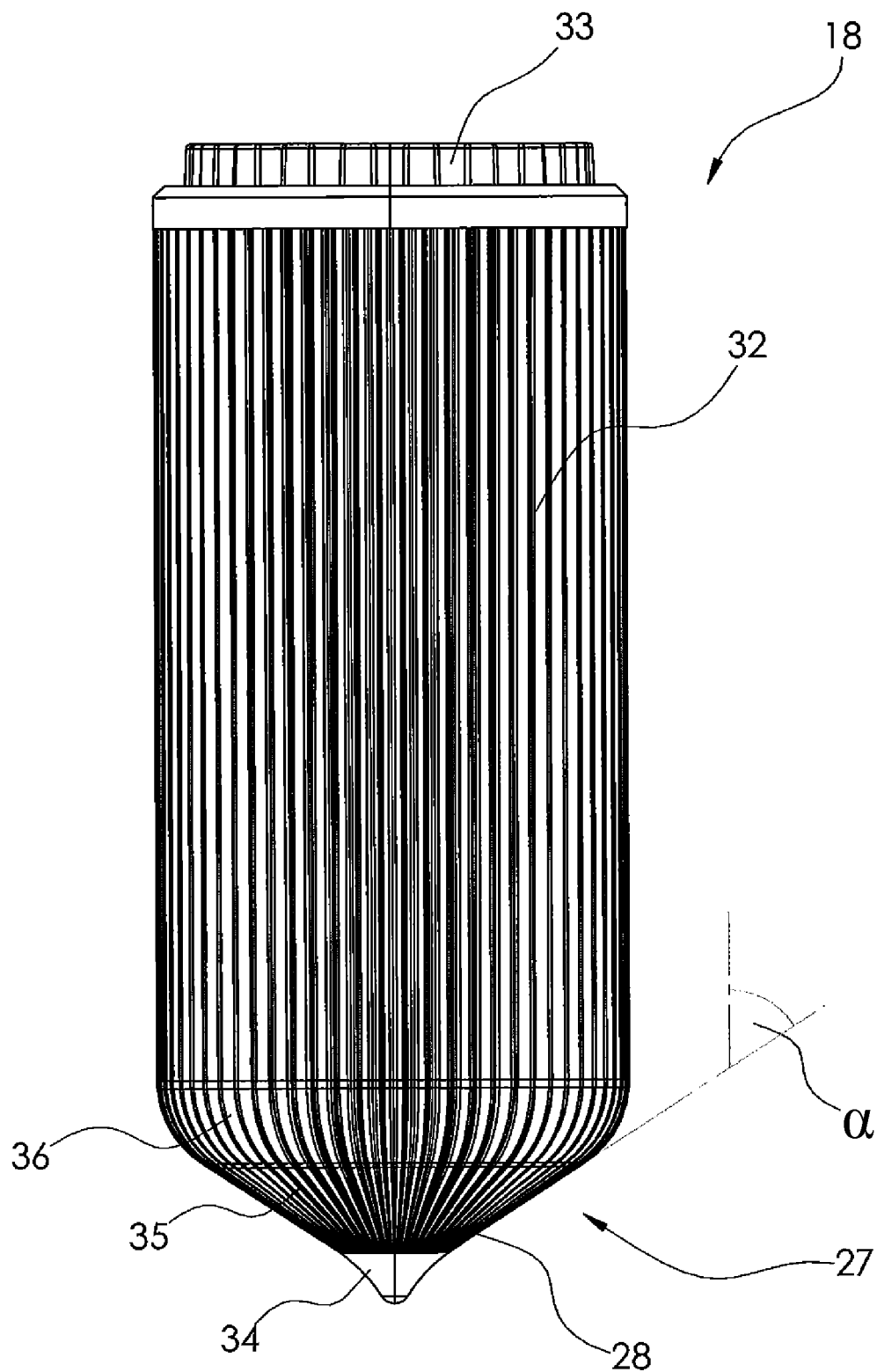
FIG. 9 shows a channel member of a chromatography system according to an embodiment of the present invention.

Additionally of alternatively, the ridges 32 may be provided on the medium-facing surface of the downstream channel member 18. For example, FIG. 9 schematically shows a downstream channel member 18 with ridges 32 on its outer surface which is its medium-facing surface 20.

In the example shown in FIG. 8, the medium-facing surface 15 of the upstream channel member 13 is its inside surface. As depicted in FIG. 1, in an embodiment the upstream channel member 13 forms an outer housing member of the chromatography system 10. However, this is not necessarily the case. In the alternative embodiment shown in FIG. 6, the upstream housing member 13 forms an inner core member.

Part of the function of the inner core member is to take up dead space within the chromatography system 10. It is desirable to take up dead space in the chromatography system 10 so as to reduce the space in which liquid flows can have a turbulent flow, flow separation and mixing. By reducing the dead space within the chromatography system 10, the flow of liquid through the chromatography system 10 can be closer to the ideal type of flow which is plug flow.

In the embodiment shown in FIG. 1, the downstream channel member 18 forms the inner core member. In the alternative embodiment shown in FIG. 6, the downstream channel member 18 forms the outer housing member of the chromatography system 10. The outer housing member at least partially surrounds the adsorbent chromatography medium 12.

Figure 11:
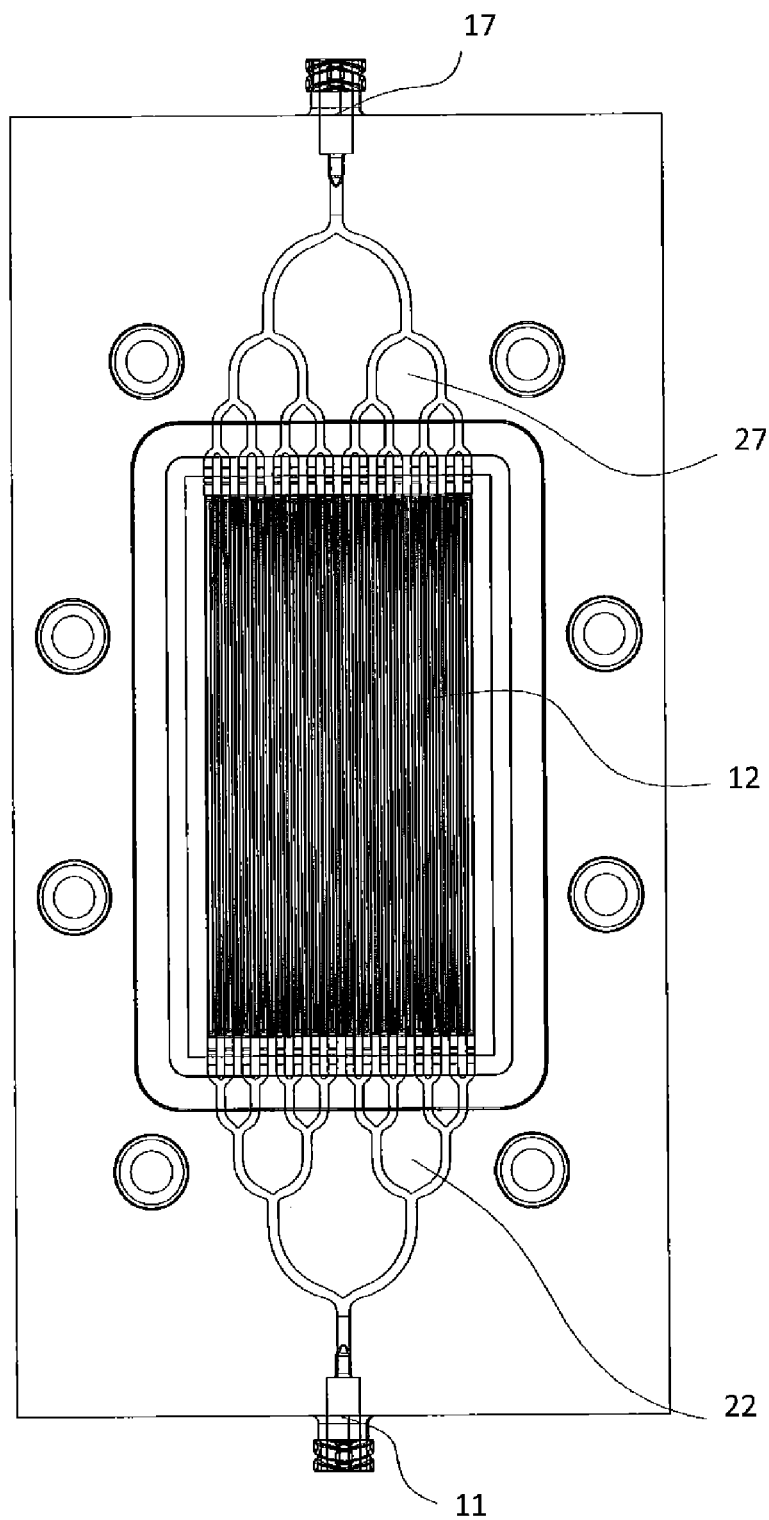
FIG. 11 is a plan view of a cross-section of a chromatography system according to an embodiment of the present invention.

In the arrangement shown in FIG. 1, the downstream direction is the downwards direction. In an embodiment, the lateral flow device (e.g. as shown in FIG. 7) comprises such ridges (which are shown particularly clearly in FIG. 11). In an embodiment the ridges have a rectangular cross-section. The ridges may be formed from a mould. The edges of the ridges may have rounded corners in cross-section so they can come out of the plastic mould. As a result, the cross-sectional shape of the ridges can range from arc-shaped to a rectangle. In an embodiment the ridges 32 extend along the downwards direction as viewed in FIG. 1. The ridges 32 may be substantially straight, as shown in FIGS. 8, 9 and 11. Alternatively, the ridges 32 may have an undulating or curved pattern, or may be helical. However, the ridges 32 always extend generally in the downstream direction from the inlet 11 to the outlet 17. Channels are formed between the ridges 32 for facilitating flow through the chromatography system 10.

The ridges 32 help to remove dead volume in the upstream channel 16 and/or the downstream channel 21. This helps to make the flow of liquid through the chromatography system 10 to be as close to the idealised plug flow as possible. The channels formed between the ridges 32 are narrow, thereby reducing the possibility of undesirable turbulent flow, flow separation, and mixing.

By providing that the ridges 32 are spaced at most 5 mm apart, the possibility of the adsorbent chromatography medium 12 settling between the ridges 32 is reduced. In particular, it may be that during manufacture or use of the chromatography system 10, the shape of the adsorbent chromatography medium 12 changes slightly, particularly under pressure. This can cause the outer surface (e.g. the upstream surface 14) of the adsorbent chromatography medium 12 to move towards the medium-facing surface 15 of the upstream channel member 13, and/or cause the inner surface (e.g. the downstream surface 19) of the adsorbent chromatography medium 12 to extend towards the medium-facing surface 20 of the downstream channel member 18.

The ridges 32 at least partially bridge the upstream channel 16 and/or the downstream channel 21 of the chromatography system 10. The ridges 32 can help to ensure that the gaps of the upstream channel 16 and/or the downstream channel are maintained during assembly of the chromatography system 10 and during use of the chromatography system 10.

By providing that the ridges 32 are spaced at most 5 mm apart, there are sufficiently frequent potential contact points with the adsorbent chromatography medium 12 to keep the upstream channel 16 and/or the downstream channel 21 open (i.e. not blocked by the adsorbent chromatography medium 12). If the ridges 32 were spaced apart by more than 5 mm, then they may not fulfil their function of keeping the channels 16, 21 open. Optionally, the ridges 32 are provided as locating features during manufacture of the chromatography system 10, rather than as features for reducing dead space within the chromatography system 10. Optionally, at least three ridges 32 are provided. By providing three ridges 32, the ridges 32 can function as locating features. It may not be necessary to provide more than three ridges 32.

The number of ridges 32 provided is not particularly limited. Merely as an example, the channel member (i.e. the upstream channel member 13 and/or the downstream channel member 18) may have at least 10, at least 20, at least 50, at least 100, at least 200, at least 500, at least 1,000, or at least 10,000 ridges 32 on its medium-facing surface. In an embodiment, 64 ridges 32 are provided. Optionally, the ridges 32 are evenly spaced in the lateral direction.

Optionally, the ridges 32 are spaced at least 1 mm apart, or at least 2 mm apart. This ensures that the narrow channels formed between the ridges 32 have sufficiently great area to allow sufficient flow through the chromatography system 10.

Optionally, the cross-sectional shape of the inner surface of the upstream channel member 13 starts as a circle where the cap 24 (to be described in more detail later) joins onto the upstream channel member 13. The ridges 32 may then start and reduce in height along the length of the upstream channel member 13. This is shown in FIG. 8.

In particular, as explained above, optionally, the upstream channel member 13 has a tapering shape so as to provide a draft angle $\theta$ with the adsorbent chromatography medium 12. Optionally, the protruding height of the ridges 32 reduces along the length of the medium-facing surface 15 of the upstream channel 13 in correspondence with the tapering shape of the upstream channel member 13. For example, the protruding height of the ridges 32 may reduce such that the peaks of the ridges 32 maintain a constant distance from the upstream surface 14 of the adsorbent chromatography medium 12 along the length of the adsorbent chromatography medium 12. Optionally, the peaks of the ridges 32 maintain a constant distance within the range of from about 0 mm (i.e. the peaks of the ridges 32 may contact the adsorbent chromatography medium 12) to about 2 mm to the upstream surface 14 of the adsorbent chromatography medium 12 along the length of the adsorbent chromatography medium 12.

Optionally, the ridges 32 abut the adsorbent chromatography medium 12. The ridges 32 can help to keep open the upstream channel 16 and/or the downstream channel 21. However, it is not necessary for the ridges 32 to abut the adsorbent chromatography medium 12. The ridges 32 might not quite touch the adsorbent chromatography medium 12. For example, in an embodiment the peaks of the ridges 32 may be at least 0.1 mm, at least 0.2 mm, at least 0.5 mm or at least 1 mm clear from the adsorbent chromatography medium 12.

Narrow channels are formed between the ridges 32. The distance from the surface of the adsorbent chromatography medium and the troughs (opposite to the peaks) of the ridges 32 may be in the region of from about 0.5 mm to about 5 mm (for example about 2 mm or about 3 mm).

The ridges 32 help to keep the upstream channel 16 and/or the downstream channel 21 of uniform size around the parameter (or across the width) of the adsorbent chromatography medium. In an embodiment the upstream channel 16 has a width within the region of from about 1 mm to about 3 mm (e.g. 2 mm). When the ridges 32 are provided, then the width of the upstream channel 16 is measured from the adsorbent chromatography medium 12 to the space between the ridges 32.

In an embodiment the downstream channel 21 has a width within the region of from about 1 mm to about 3 mm (e.g. 2 mm). When the ridges 32 are provided, the width of the downstream channel 21 is measured from the adsorbent chromatography medium 12 to the space between ridges 32.

However, it is not necessary for the ridges 32 to be provided. In an alternative embodiment the ridges 32 are not provided such that the medium-facing surfaces 15, 20 of the channel members 13, 18 is substantially smooth.

As depicted in FIGS. 1 and 6, optionally the chromatography system 10 comprises an upstream flow guide 22. The upstream flow guide 22 is downstream of the inlet 11. The upstream flow guide 22 is upstream of the adsorbent chromatography medium 12. The upstream flow guide 22 is configured to distribute a flow of a liquid around the adsorbent chromatography medium 12. For example, when liquid enters through the inlet 11, the liquid flows over the upstream flow guide 22 so as to be distributed around the perimeter of the upstream flow guide 22 so that the full lateral extent of the adsorbent chromatography medium 12 is used.

As depicted in FIGS. 1 and 6 in an embodiment the chromatography system 10 comprises a downstream flow guide 27. The downstream flow guide 27 is downstream of the adsorbent chromatography medium 12. The downstream flow guide 27 is upstream of the outlet 17.

As shown in FIG. 1, optionally the inlet 11 is formed within a cap 27. The cap is attached to the outer housing member of the chromatography system 10. In the example shown in FIG. 1, the outer housing member corresponds to the upstream channel member 13. Alternatively, in the arrangement shown in FIG. 6, the outer housing member corresponds to the downstream channel member 18.

Liquid that enters the inlet 11 flows through a channel 26 formed between a cap-facing surface 23 of the upstream flow guide 22 and a flow guide-facing surface 25 of the cap 24. After the liquid has passed through the adsorbent chromatography medium 12, the liquid passes through another channel 31 formed between a housing-facing surface 28 of the downstream flow guide 27 and a flow guide-facing surface 30 of the outlet housing member 29 in which the outlet 17 is formed.

Desirably, the channels 26, 31 are narrow so that the flow of liquid through them is as close as possible to plug flow. Optionally, the shape of the upstream flow guide 22 corresponds to the shape of the inner surface of the cap 24. This helps to reduce the width of the channel 26 formed between them. Similarly, the shape of the downstream flow guide 27 may substantially correspond to the shape of the outlet housing member 29 in which the outlet 17 is formed so as to minimise the size of the channel 31 that connects a downstream channel 21 to the outlet 17.

Optionally, at least one of the upstream flow guide 22 and the downstream flow guide 27 is shaped as a convex dome. This helps to reduce the sharpness of any corners and create a smoother volume expansion in the flow area near the inlet 11 and the outlet 17 of the chromatography system 10. Any sudden changes in the flow area can cause flow separation and therefore mixing of the reagent, which is undesirable. By providing that at least one of the upstream flow guide 22 and the downstream flow guide 27 is shaped as a convex dome, flow separation and mixing of the reagent can be reduced.

Figure 10:
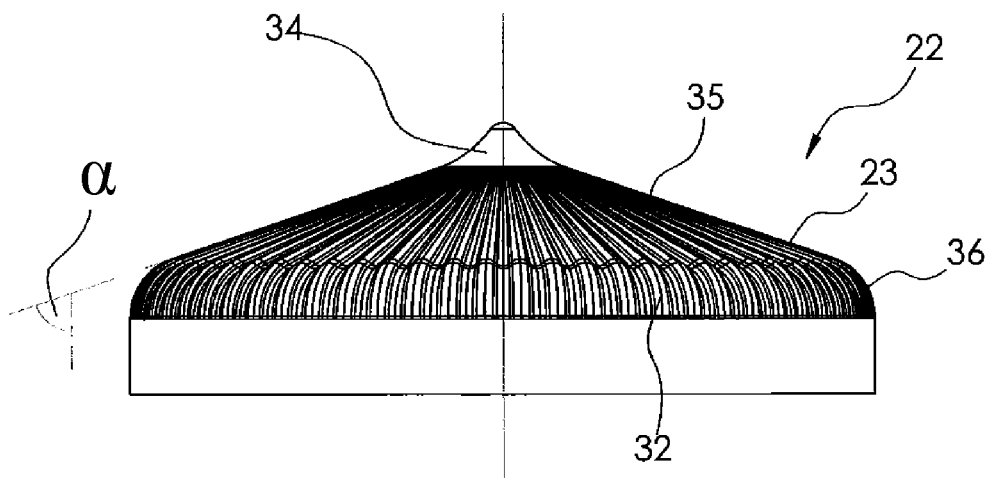
FIG. 10 shows a flow guide of a chromatography system according to an embodiment of the present invention.

Optionally, at least one of a surface of the upstream flow guide 22 and a surface of the downstream flow guide 27 comprises ridges 32 extending in the downstream direction. For example, FIG. 10 shows a side-view of an upstream flow guide 22 of a chromatography system 10 according to an embodiment of the present invention. As shown in FIG. 10, a cap-facing surface 23 of the upstream flow guide 22 comprises ridges 32. The number of ridges 32 provided is not particularly limited. For example, the number of ridges 32 may be at least 3, at least 10, at least 20, at least 50, at least 100, at least 200, at least 500 or at least 1,000, for example. Optionally, the ridges 32 are evenly spaced around the upstream flow guide 22.

FIG. 9 depicts a downstream flow guide 27 that has a surface 28 comprising ridges 32. In the construction shown in FIG. 9, the downstream flow guide 27 is formed integrally with the downstream channel member 18. However, this is not necessarily the case. For example, the downstream channel member 18 and the downstream flow guide 27 may be formed as separate components that are later attached to each other, for example by welding.

As shown in FIG. 9, the ridges 32 on the medium-facing surface 20 of the downstream channel member 18 join continuously onto the ridges 32 on the surface 28 of the downstream flow guide 27. This helps to provide continuous channels for a quick flow of liquid through the chromatography system 10. However, this is not necessarily the case. For example, the number of ridges 32 provided on the downstream flow guide 27 may be different from the number of ridges 32 provided on the outer surface of the downstream channel member 18, in which case the ridges 32 may not exactly matchup between the downstream flow guide 27 and the downstream channel member 18.

As shown in FIGS. 9 and 10, optionally the convex dome comprises a central section 34. The central section 34 extends from an axial centre of the convex dome and along no more than 50% of a radius of the convex dome. When the convex dome is viewed in plan view, the convex dome appears as a circle. The central section 34 is the central part of that circle. Optionally, the cone angle of the convex dome increases in the central section away from a tip of the convex dome. This can be seen in FIG. 10 where (apart from the rounded tip of the convex dome), the cone angle generally increases in the central section 34 in the direction away from the tip (i.e. in the downwards direction in FIG. 10). This helps to create a smoother flow path and a more gradual increase and decrease of the flow area, so as to reduce flow separation within the chromatography system 10.

Optionally, the geometry of the convex dome at the inner core member (e.g. as depicted in FIG. 9) is different from the geometry of the convex dome to which the adsorbent chromatography medium 12 is attached (e.g. the convex dome depicted in FIG. 10. In general, the convex dome at the inner core member is narrower than the other convex dome.

Optionally, the cone angle in the central section 34 increases such that the surface of the central section forms an arc of a circle in a vertical cross-section of the convex dome (e.g. in the plane of the paper in FIG. 10). In an embodiment of the convex dome to which the adsorbent chromatography medium 12 is attached, the arc is of a circle having a radius of curvature within the range of from about 2 mm to about 10 mm (e.g. about 7 mm). In an embodiment of the convex dome of the inner core member, the arc is of a circle having a radius of curvature within the range of from about 5 mm to about 20 mm (e.g. about 10 mm).

As depicted in FIGS. 9 and 10, in an embodiment the convex dome has a rounded tip. In an embodiment of the convex dome to which the adsorbent chromatography medium 12 is attached, the tip is rounded to have a radius of curvature within the range of from about 0.5 mm to about 2 mm (e.g. about 1 mm). In an embodiment of the convex dome of the inner core member, the tip is rounded to have a radius of curvature within the range of from about 0.5 mm to about 2 mm (e.g. about 1 mm). This helps to create a smoother flow path and a more gradual increase and decrease of the flow area, so as to reduce flow separation within the chromatography system 10.

However, it is not necessary for the central section 34 to have a geometry as shown in FIGS. 9 and 10. In an alternative embodiment, the central section is flat, i.e. perpendicular to the axis of the chromatography system 10.

As depicted in FIGS. 9 and 10, optionally the convex dome comprises a middle section 35 that extends along at least 50% of a radius of the convex dome. The middles section 35 surrounds the central section 34 in plan view. Optionally, the cone angle of the convex dome remains substantially constant throughout the middle section. Optionally, the cone angle of the convex dome varies by no more than 10% along the middle section 35. Optionally, the cone angle of the convex dome is at least 60° in the middle section. Hence, the cone angle is at least 60° along most of the radius of the convex dome.

In FIG. 9 and FIG. 10, the cone angle is represented by a. As shown in FIG. 10, in an embodiment the upstream flow guide 22 comprises three sections (which may be formed integrally together). In the central section 34, the cone angle initially increases away from the inlet 11. In the middle section 35, the cone angle steadies out to a roughly constant value. The middle section 35 takes up most of the radius of the convex dome. In the peripheral section 36 (which surrounds the middle section 35), the cone angle decreases so as to provide a smooth transition to the outer surface of the adsorbent chromatography medium 12. In an embodiment of the convex dome to which the adsorbent chromatography medium 12 is attached, the peripheral section 36 comprises a curve (in a cross-sectional plane that comprises the axis of the chromatography system 10) that has a radius of curvature in the region of from about 2 mm to about 5 mm (e.g. about 4 mm). In an embodiment of the convex dome of the inner core member, the peripheral section 36 comprises a curve (in a cross-sectional plane that comprises the axis of the chromatography system 10) that has a radius of curvature in the region of from about 5 mm to about 10 mm (e.g. about 6.5 mm).

The cone angle α shown in FIG. 10 corresponds to the cone angle α for the middle section 35 of the upstream flow guide 22. Similarly, FIG. 9 shows a downstream flow guide 27 that has a central section 34, a middle section 35 and a peripheral section 36. In the central section 34, the cone angle initially increases away from the outlet 17. In the middle section 35, the cone angle α steadies to a value that may be at least 60°. The middle section 35 extends along most of the radius of the convex dome. In the peripheral section 36 the cone angle decreases so as to provide a smooth transition to the medium-facing surface 20 of the downstream channel member 18.

However, it is not necessary for the convex domes to be provided. In an alternative embodiment, the upstream flow guide 22 and/or the downstream flow guide 27 are substantially flat (equivalent to a cone angle of 90°).

Optionally the ridges 32 on the upstream flow guide 22 and/or the downstream flow guide 27 are spaced at most 5 mm apart. Optionally, the protruding height of the ridges 32 of the upstream flow guide decreases towards the inlet 11. This is shown in FIG. 10, where the protruding height of the ridges 32 has decreased to 0 (i.e. such that there are no ridges) in the central section 34 of the upstream flow guide 22. Optionally, the protruding height of the ridges 32 of the downstream flow guide 27 decreases towards to the outlet 17. This is shown in FIG. 9, in which the central section 34 of the downstream flow guide 27 has no ridges because the height of the ridges has decreased to 0.

Optionally, the ridges 32 at the downstream flow guide 27 abut against the outlet housing member 29 in which the outlet 17 is provided. The ridges 32 guide the flow of liquid towards the outlet 17.

Optionally, the ridges 32 on the upstream flow guide 22, the downstream flow guide 27, the upstream channel member 13 and/or the downstream channel member 18 have a protruding height of at least 0.25 mm. This reduces the possibility of the adsorbent chromatography medium 12 settling between the ridges 32. In particular, if the ridges 32 are too small, then the adsorbent chromatography medium 12 could extend between the ridges 32, thereby closing off the channels, when the shape of the adsorbent chromatography medium 12 changes during manufacture or during use of the chromatography system 10.

Optionally, the ridges 32 have a protruding height of at most 10 mm. This ensures that the channels between the ridges 32 are not too large. If the channels between the ridges 32 are too large, then this increases the dead volume in which liquid can undesirably mix.

In the constructions shown in FIG. 1 and FIG. 6, the outlet housing member 29 is formed integrally with the outer housing member. However, this is not necessarily the case. In an alternative embodiment, the outlet housing member 29 is formed as a separate component from the outer housing member and then attached to the outer housing member. For example, the outlet housing member 29 may be welded or glued to the outer housing member.

Optionally, the ridges 32 on the convex dome of the inner core member abut the dome-facing surface 30 of the outlet housing member 29. The ridges 32 define narrow channels through which liquid flows to the outlet 17 (or from the inlet 11 in the construction shown in FIG. 6).

FIG. 11 is a plan view of a cross-section of a chromatography system 10 according to an embodiment of the present invention. The chromatography system 10 depicted in FIG. 11 is for tangential flow chromatography or lateral flow chromatography.

Figure 12:
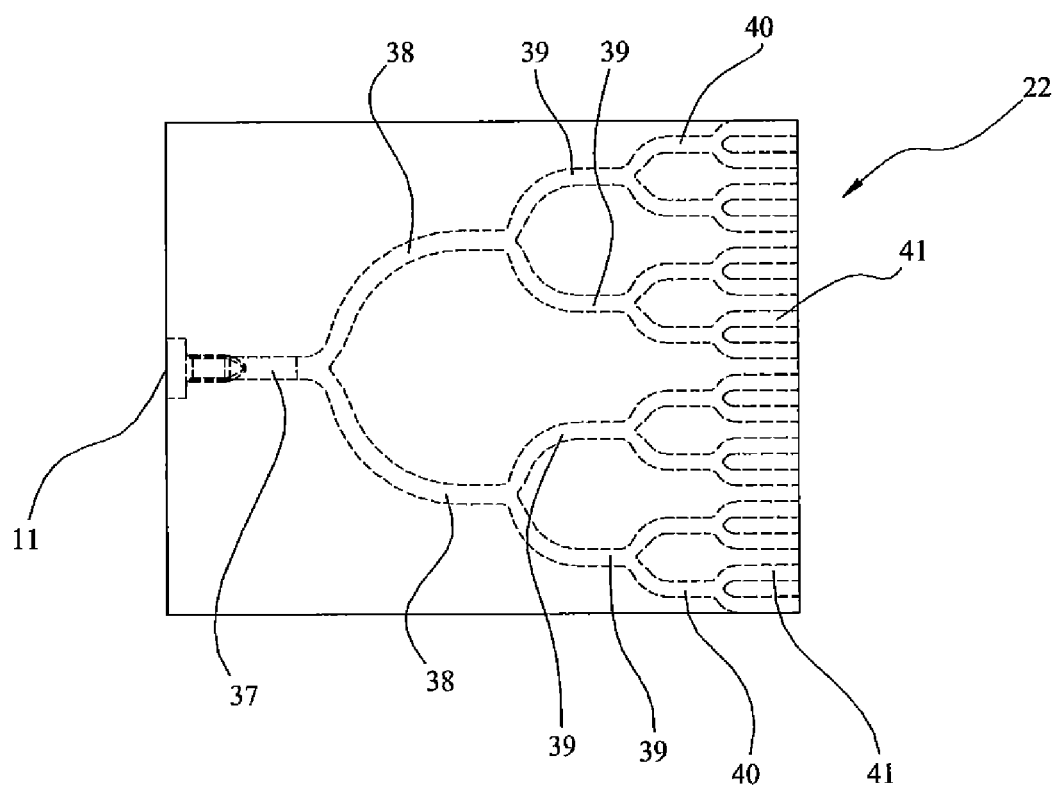
FIG. 12 is a schematic diagram of a flow guide of a chromatography system according to an embodiment of the present invention.

In the chromatography system 10 depicted in FIG. 11, the upstream flow guide 22 and the downstream flow guide 27 are not dome-shaped. Instead, the upstream flow guide 22 comprises a pattern of channels. The pattern of channels provides flow paths from the inlet 11 to different parts of the adsorbent chromatography medium 12 along the width of the adsorbent chromatography medium 12. The pattern of channels is provided so as to reduce a difference in arrival time and/or flow velocity of liquid reaching the adsorbent chromatography medium 12 across the width of the adsorbent chromatography medium 12. FIG. 12 is a more detailed view of the flow guide 22. The flow guide 22 extends between the inlet 11 and the adsorbent chromatography medium 12.

Typically, when liquid is input into an inlet through a pipe, the flow velocity varies across the pipe. In particular, the flow velocity is expected to be greatest in the middle of the pipe, with the lowest flow velocity at the edge of the pipe. This variation in flow velocity is undesirable because it increases the deviation in arrival time at which the pulse contacts the chromatography media across its width, i.e. the time of liquid reaching the adsorbent chromatography medium 12 across the width of the adsorbent chromatography medium 12. The flow guide 22 is configured to reduce differences in arrival time at the adsorbent chromatography medium 12. The arrival time is related to the amount of time that the liquid takes to flow along the channels of the flow guide 22. This amount of time can be called the residence time for the various channels of the flow guide 22.

Hence, it is possible that the liquid introduced via the inlet 11 could reach the adsorbent chromatography medium at different times and/or have different flow velocities when it reaches the adsorbent chromatography medium 12. Specifically, the flow velocity is liable to be greater in the middle of the adsorbent chromatography medium 12 and lower at the edges of the adsorbent chromatography medium 12, such that the liquid is liable to reach the edges (in the width direction) of the adsorbent chromatography medium 12 before reaching the middle (in the width direction) of the adsorbent chromatography medium 12.

According to an embodiment of the present invention, the flow guide 22 is provided to reduce this difference in arrival time and/or flow velocity across the width of the adsorbent chromatography medium 12. This reduces the possibility of mixing. In turn, this increases the effective capacity of the chromatography system 10.

Figure 13:
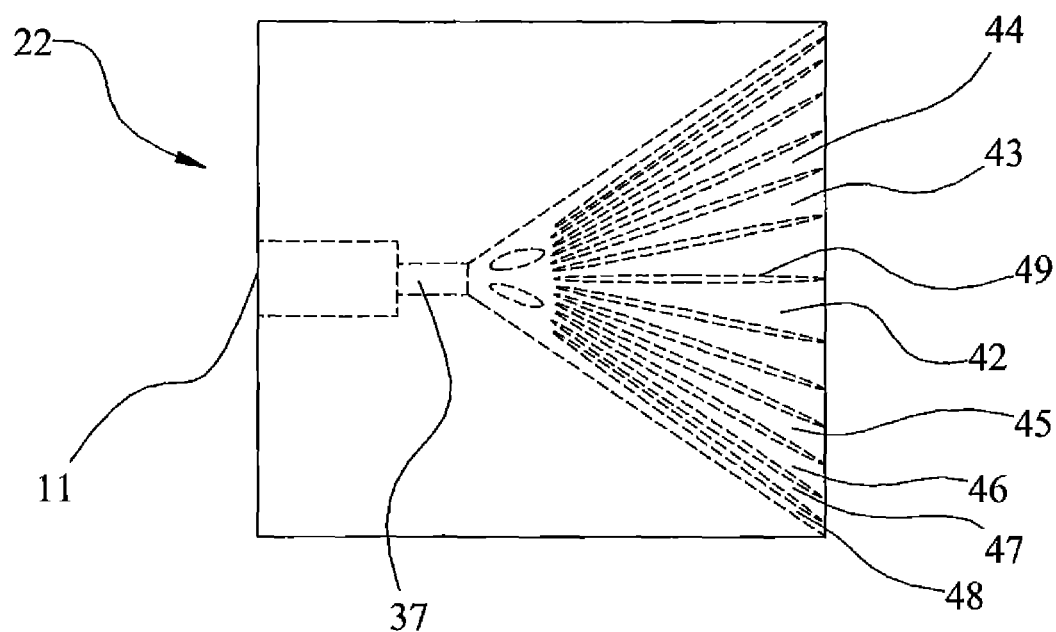
FIG. 13 is a schematic diagram of a flow guide of a chromatography system according to an embodiment of the present invention.

There are different ways of reducing the difference in arrival time and optionally also flow velocity across the width of the adsorbent chromatography medium 12. FIG. 12 schematically depicts one way and FIG. 13 schematically depicts an alternative way.

As depicted in FIG. 12, in an embodiment the pattern of channels is arranged so as to provide flow paths that have similar or the same lengths as each other. In particular, optionally the pattern of channels is arranged such that the flow paths have lengths within 50%, optionally within 30% and optionally within 10% of each other. By providing that all of the flow paths have the same length, the variation in arrival time and flow velocity can be reduced. In the arrangement shown in FIG. 12, each flow path is substantially the same in terms of having the same length and the same cross-sectional area at each point along the flow path. This helps to reduce the difference in arrival time and flow velocity across the width of the adsorbent chromatography medium 12.

Figure 27:
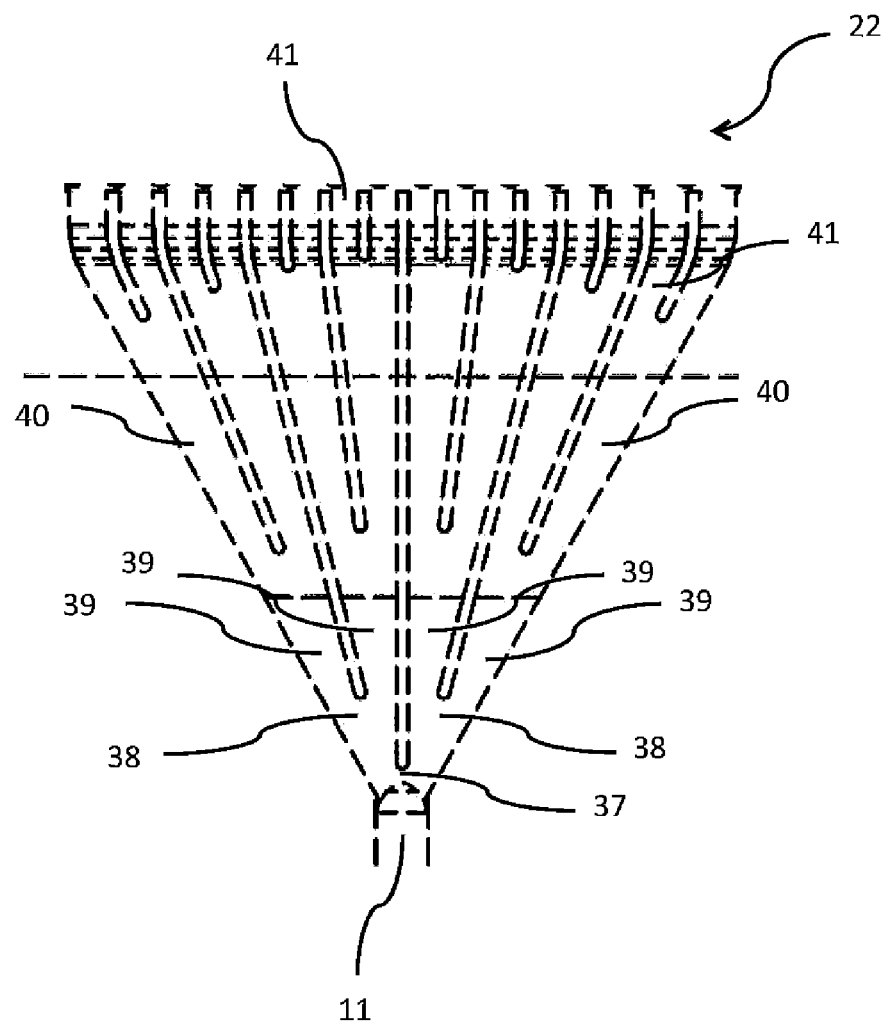
FIG. 27 is a schematic diagram of a flow guide of a chromatography system according to an embodiment of the present invention.

As depicted in FIG. 12 or (in an alternative embodiment) in FIG. 27, in an embodiment the pattern of channels comprises a channel 37 from the inlet 11 that divides into two symmetric channels 38. Each symmetric channel 38 divides successively into two symmetric channels 39, 40, 41 until the flow paths reach the adsorbent chromatography medium 12. The widths of the channels depends on the scale of the chromatography system 10. In the arrangement shown in FIG. 12, the width of each channel is substantially the same. However, this is not necessarily the case. As shown in FIG. 27, optionally the width of the channels decrease with each successive split towards the adsorbent chromatography medium. In a further alternative embodiment, the width of the channels increases after each split. By controlling the width at each division, it is possible to control the expansion event. The flow is split in discrete stages and there is a very controlled volume expansion which is another key aspect in moving towards idealised plug flow. The number of times that the flow paths split into two is not particularly limited.

In an embodiment, the channels split within a single plane. The pattern of channels extends within the single plane. This is different from devices in which channels split three-dimensionally. As explained in further detail below, in an embodiment the single plane (in which the pattern of channels extends) is arranged at an angle relative to the upstream channel 16.

In an embodiment the pattern of channels forms a fractal. The pattern of channels repeats geometrically. For example, as mentioned above each channel splits into a plurality of channels in the downstream direction of the flow guide 22. Each part of the pattern of channels has the same geometrical shape as the whole pattern of channels. This is because each channel splits in the same way into a plurality of channels.

FIG. 13 depicts an alternative arrangement for the flow guide 22. As depicted in FIG. 13, in an embodiment the pattern of channels is arranged such that longer flow paths have a smaller volume (i.e. cross-sectional area) than shorter flow paths. For example, as shown in FIG. 13, in an embodiment, ridges 49 are provided to divide flow paths. The flow paths 42 in the middle are shorter than the outer flow paths 43, 44, 45, 46, 47, 48. The flow paths become progressively longer from the middle flow paths 42 to the outermost flow paths 48.

The ridges 49 define the boundaries between the flow paths. The ridges 49 are arranged such that the middle flow paths 42 are the widest, and therefore have the greatest cross-sectional area. The widths of the flow paths progressively decrease going from the middle flow paths 42 to the outermost flow paths 48.

Where flow paths have a greater cross-sectional area, there is a reduction in linear velocity along the flow paths. Hence, by providing that the volumes of flow paths are greater where the flow paths are shorter, the difference in arrival time of liquid when it reaches the adsorbent chromatography medium 12 is reduced. As depicted in FIG. 13, optionally a channel 37 extends from between the inlet 11 to the series of flow paths 42 to 48 that reach the adsorbent chromatography medium 12.

Optionally, the width of each flow path at the adsorbent chromatography medium end decreases by 20-50% for each successive flow path going from the middle flow path to the outermost flow path.

Figure 14:
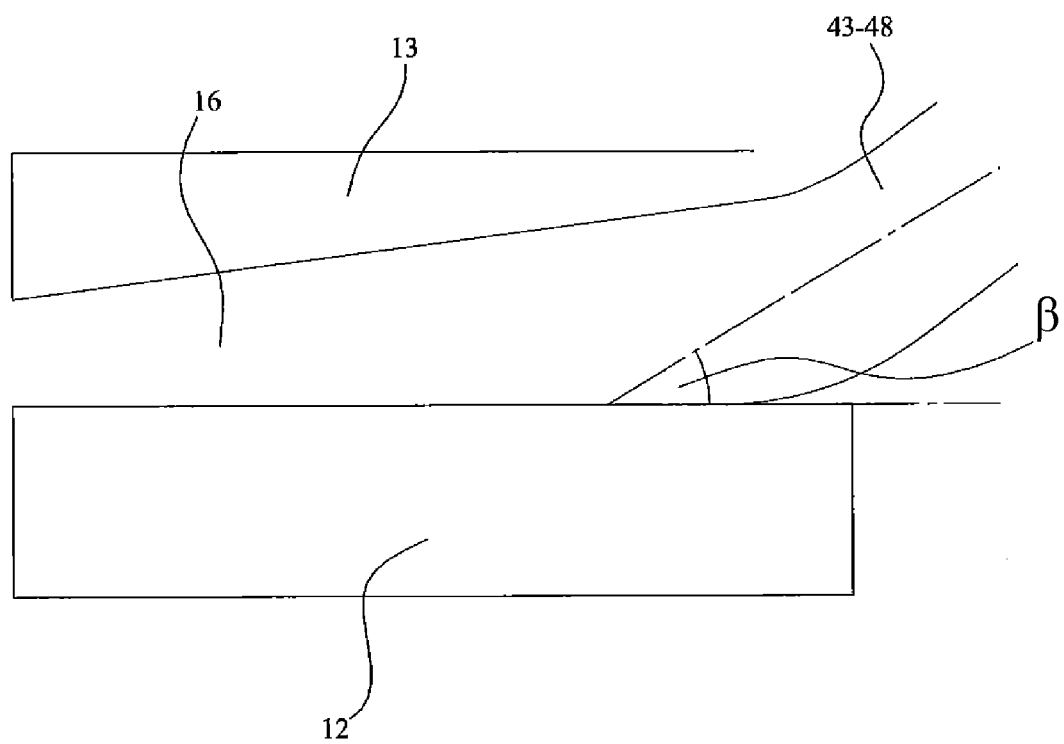
FIG. 14 is a schematic diagram showing the entry angle of liquid reaching the chromatography medium in a chromatography system according to an embodiment of the present invention.

As depicted in FIG. 7, liquid that enters the inlet 11 flows through the flow guide 22 and into the upstream channel 16 where it comes into contact with the adsorbent chromatography medium 12. The flow guide 22 is arranged such that the channels (e.g. channels 41 or channels 42-48) and the adsorbent chromatography medium 12 form an entry angle $\beta$ relative to each other. This entry angle $\beta$ is shown schematically in FIG. 14. The entry angle $\beta$ between the channels of the flow guide 22 and the adsorbent chromatography medium 12 is not particularly limited. The entry angle $\beta$ may be in the range of from 0°-90°.

Optionally, the entry angle $\beta$ is at most about 45°. By providing that the entry angle where the fluid enters the upstream channel 16 is at most 60° or at most 45°, a desirable shearing force can be provided across the upstream surface 14 of the adsorbent chromatography medium 12. The shearing force can help to stop debris from settling and fouling the upstream surface 14 of the adsorbent chromatography medium 12. Optionally, the entry angle β of entry for the fluid is at most 60° or at most 30°, for example.

Optionally, the entry angle β of entry for the fluid is at most 45° or at most 30° or at most 20°, for example. By providing an upper limit on the entry angle β, the fluid has a significant velocity component along the direction of the upstream channel 16 (i.e. parallel to the surface of the chromatography medium 12). As a result, the fluid flows along the upstream channel 16, rather than flowing directly into the chromatography medium 12. Optionally, the flow guide 22 is configured such that the fluid at the exit of the flow guide 22 has a greater speed parallel to the chromatography medium 12 than perpendicular to the chromatography medium 12.

The channels of the flow guide extend longitudinally in a direction that extends at the entry angle β from the surface of the chromatography medium. Optionally, the entry angle β is at least 5°, and optionally at least 10°. By providing a lower limit for the entry angle β, the speed of flow of fluid through the chromatography system 10 can be increased.

As depicted in FIGS. 7 and 11, most of the flow guide 22 is laterally displaced from the chromatography medium 10. The flow guide 22 is not positioned directly above the chromatography medium, except for optionally a small overlap at the end of the flow guide 22. As a result, the fluid is not forced directly through the chromatography medium 12 by gravity in a direction perpendicular to the surface of the chromatography medium 12. Instead, the fluid can build up speed parallel to the surface of the chromatography medium 12 before the fluid enters the upstream channel 16 or comes into contact with the chromatography medium 12.

Figure 15:
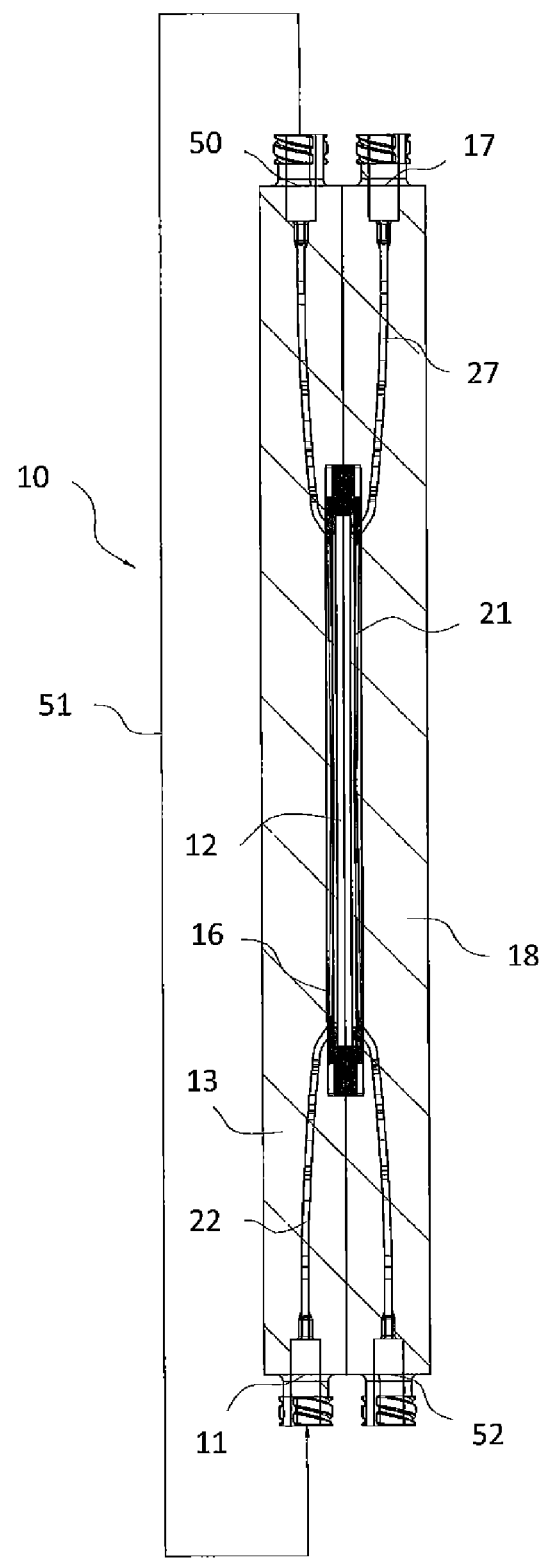
FIG. 15 is a perspective cross-sectional view of a chromatography system according to an embodiment of the present invention.

FIG. 15 schematically depicts a cut-away view of a chromatography system 10 according to an embodiment of the present invention. The chromatography system 10 shown in FIG. 15 is for tangential flow chromatography or lateral flow chromatography.

As depicted in FIG. 15, in an embodiment the chromatography system 10 comprises a feed flow outlet 50. The feed flow outlet is separate from the outlet 17. The feed flow outlet 50 is on the same side of the adsorbent chromatography medium as the inlet 11. In contrast, the outlet 17 is on the opposite side of the adsorbent chromatography medium 12 from the inlet 11.

The feed flow outlet 50 forms part of a recirculation loop 51. The recirculation loop 51 is for recirculating liquid back to the inlet 11 from the feed flow outlet 50. The feed flow outlet 50 allows the chromatography system 20 to be used for tangential flow chromatography. Tangential flow means that liquid flows into the inlet 11, tangentially across the surface of the adsorbent chromatography medium 12 and through the feed flow outlet 50 to be recirculated. The tangential flow helps to stop fouling of the adsorbent chromatography medium 12. This means that greater volumes of liquid containing a target protein, for example, can pass through the adsorbent chromatography medium 12 before it becomes fouled.

Desirably, a fast flow can be provided between the inlet 11 and the feed flow outlet 50, with liquid passing through the outlet 17 after passing through the adsorbent chromatography medium 12.

Tangential flow chromatography is particularly desirable when cells or other insoluble, or soluble or suspended material is present in the solution. For example, a crude feed stream may be provided into the inlet 11 from a bioreactor, for example. The crude feed stream may comprise cells. The solution containing the cells can be recirculated through the feed flow outlet 50 and the recirculation leap 51 back to the adsorbent chromatography medium 12. Some cells might pass through the adsorbent chromatography medium 12, depending on whether the adsorbent chromatography medium is permeable, semi-permeable or impermeable to the cells or other insoluble or soluble material in suspension. Optionally, a second filter material is provided to stop cells from passing through from the inlet 11 to the outlet 17, which could be layered on top of, underneath of or layered throughout the chromatography media.

Lateral flow chromatography is different from tangential flow chromatography. In lateral flow chromatography, the feed flow outlet 50 is not present or is not used. In lateral flow chromatography, only the inlet 11 is used on that side of the adsorbent chromatography medium. Lateral flow chromatography is similar to the radial flow chromatography used in the systems depicted in FIGS. 1 and 6, but with different geometry of the chromatography system 10.

As depicted in FIG. 15, optionally the chromatography system 10 comprises a backflow inlet 52. The backflow inlet 52 is separate from the inlet 11. The backflow inlet 52 is on the same side of the adsorbent chromatography medium 12 as the outlet 17. In contrast, the inlet 11 is on the opposite side of the adsorbent chromatography medium 12 from the outlet 17.

The backflow inlet 52 is for flowing liquid back through the adsorbent chromatography medium 12. For example, once the adsorbent chromatography medium 12 is fully loaded with the target protein, a buffer solution and/or a cleaning agent may be passed through the backflow inlet 52 and through the adsorbent chromatography medium 12. The buffer and/or cleaning agent can help to remove fouling material on the adsorbent chromatography medium 12. The buffer and/or cleaning agent can help to clean the adsorbent chromatography medium 12. A buffer solution can be used to help elute the desired product in a concentrated format.

Optionally, the backflow inlet 52 can be used to bleed air from the chromatography system 10.

In particular, it is possible (or the gas) to get trapped in the chromatography system 10. The backflow inlet 52 makes it easier to remove such trapped air, which can otherwise undesirably affect the performance of the chromatography system 10.

The chromatography system depicted in FIG. 15 can be operated as a tangential flow filter and a chromatography stage in a single device.

Optionally, the adsorbent chromatography medium 12 comprises polymer nanofibers. The polymer nanofibers may have mean diameters from 10 nm to 1000 nm. For some applications, polymer nanofibers having mean diameters from 200 nm to 800 nm are appropriate. Polymer nanofibers having mean diameters from 200 nm to 400 nm may be appropriate for certain applications.

Optionally, the polymer nanofibers are provided in the form of one or more non-woven sheets, each comprising one or more polymer nanofibers. Optionally, the adsorbent chromatography medium 12 is formed of one or more non-woven sheets, each comprising one or more polymer nanofibers. A non-woven sheet comprising one or more polymer nanofibers is a mat of the one or more polymer nanofibers for each nanofiber oriented essentially randomly, i.e. it has not been fabricated so that the nanofiber or nanofibers adopt a particular pattern.

Optionally, the adsorbent chromatography medium is spiral wound. This means that the adsorbent chromatography medium 12 is formed by winding one or more non-woven sheets.

Optionally, the adsorbent chromatography medium 12 comprises one or more spacer layers. The spacer layers may be provided to add structural integrity to the adsorbent chromatography medium 12. In particular, the spacer layers may be more mechanically rigid than the non-woven sheets of nanofibers. The spacer layers can help to reduce deformation of the adsorbent chromatography medium 12 during manufacture and/or use of the chromatography system 10.

Optionally, the adsorbent chromatography medium 12 is provided with a frit at its upstream surface 14 and/or at its downstream surface 19. The frit may be particularly useful at the downstream surface 19 of the adsorbent chromatography medium 12. This is because the frit helps to provide mechanical stability to the adsorbent chromatography medium 12 and can increase the backpressure so as to improve flow distribution across the chromatography medium 12. Particularly during use of the chromatography system 10, it is possible for the adsorbent chromatography medium 12 to deform under pressure. Deformation of the adsorbent chromatography medium 12 can undesirably result in the adsorbent chromatography medium 10 blocking the downstream channel 21 of the chromatography system 10. By providing a frit, this deformation is less likely to occur, thereby making the chromatography system 10 more reliable.

However, it is not necessary for spacer layers or the frits to be provided. For example, as mentioned above ridges 32 may be provided on the medium-facing surfaces of the upstream channel member 13 and/or the downstream channel member 18. The ridges 32 can help to keep the upstream channel 16 and the downstream channel 21 open. Particularly when the ridges 32 are provided, the frits may not be necessary. In a further alternative embodiment, neither the frits nor the ridges 32 are provided.

As mentioned above, the ridges 32 can help to reduce the dead space in the chromatography system 10. This helps to increase the capacity of the chromatography system 10 by making the flow of liquid through the chromatography system 10 closer to plug flow. Additionally, the ridges 32 can make it easier to manufacture the chromatography system 10. In particular, the ridges 32 can be used as locating features during manufacture of the chromatography system 10.

In the embodiment shown in FIG. 1, the outer housing member corresponds to the upstream channel member 13, which is provided integrally with the outlet housing member 29 in which the outlet 17 is provided. This outer housing member surrounds the adsorbent chromatography medium 12 in the chromatography system 10.

During manufacture, the cylindrically-shaped adsorbent chromatography medium 12 is attached to the convex dome-shaped flow guide 22. This may be done by applying heat and pressing the upper end of the adsorbent chromatography medium into the underside of the upstream flow guide 22. Optionally, an inner core housing member (e.g. the downstream channel member 18 in the construction shown in FIG. 1) may be provided on the inside of the adsorbent chromatography medium 12.

The adsorbent chromatography medium 12 (attached to the upstream flow guide 22) is positioned axially within the outer housing member, which is a cylindrically-shaped channel member 13. The upstream flow guide 22 protrudes from an open end of the channel member 13.

The cap 24 is joined to the open end of the channel member 13. For example, the cap 24 may be welded or (e.g. by spin welding, ultrasonic welding or laser welding) or glued to the open end of the channel member 13. The cap 24 has an inner surface shape corresponding to the convex dome-shaped flow guide 22.

As explained above, optionally the medium-facing surface 15 of the channel member 13 comprises ridges 32. The ridges 32 are used during manufacture for centring the adsorbent chromatography medium 12 within the channel member 13. For example, the outer surface of the adsorbent chromatography medium 12 may come into contact with the ridges 32 so as to centre the adsorbent chromatography medium 12.

By centring the adsorbent chromatography medium 12, the upstream flow guide 22 is also centred axially within the channel member 13. As a result, the flow guide 22 is centred relative to the cap 24 such that the flow guide 22 and the cap 24 are axially aligned to a higher degree of precision than would otherwise be possible. This means that it is easier to make the channel 26 between the cap 24 and the flow guide 22 to be smaller without the cap 24 coming into contact with the flow guide 22.

Optionally, the cap 24 is welded to the open end of the channel member 13 by spin welding. In a spin welding process, the cap 24 is spun relative to the channel member 13 such that friction causes the cap 24 to weld to the channel member 13. During this process, it is important that the underside of the cap 24 does not come into contact with the flow guide 22. The centring function provided by the ridges 32 reduces the possibility of the cap 24 coming into contact with the flow guide 22. This reduces the manufacturing tolerances such that the channel 26 can be made smaller, which makes the flow through the chromatography system 10 closer to plug flow.

Optionally, the cap 24 is spaced from the flow guide 22 by less than 5 mm, optionally by less than 2 mm, optionally by less than 1 mm.

As mentioned above, the chromatography system 10 shown in FIG. 15 can be used for tangential flow filtration and chromatography. This process may comprise providing a flow comprising cells through the inlet 11 to the adsorbent chromatography medium 12. The flow is recirculated through the recirculation loop 51 including the inlet 11 to the adsorbent chromatography medium 12. A flow comprising at least one of a buffer and a cleaning agent is then provided through the backflow inlet 52 (and/or through the outlet 17) and back through the adsorbent chromatography medium 12.

Optionally, the chromatography system 10 of any embodiment of the invention can be used in a process for isolating one or more biological molecules from a mobile phase. Such a process may comprise contacting one or more biological molecules in a mobile phase with the adsorbent chromatography medium 12. The mobile phase may be provided through the inlet 11 of the chromatography system 10.

For example, in ionic chromatography (although affinity chromatography may also be used), initially a low ionic strength buffer may be provided such that negatively charged ions bind to positively charged ionic groups in the matrix of the chromatographic media. Subsequently, a solution comprising negatively charged proteins may be provided. The negatively charged proteins bind to the positively charged ionic groups in place of the negatively charged ions from the low ionic strength buffer. A higher ionic strength buffer may then be used to displace the bound proteins at the binding sites.

As depicted in FIG. 9, in an embodiment the inner core member comprises an upper section 33 for attaching the inner core member to a flow guide 22. For example, the upper section 33 may be welded to the flow guide 22.

Optionally, the chromatography system 10 according to an embodiment of the present invention is configured to filter particulates from a flow of a suspension of material, and to isolate one or more biological molecules from the suspension of material by contacting one more biological molecules in the suspension of material with the absorbent chromatography medium 12. The chromatography system 10 is configured to filter any particulates (e.g. solid materials, cells and their debris in suspension). All smaller biological molecules will be able to pass through the nanofibers (which may have a pore size of approximately 2 µm).

In other words, the chromatography system 10 of the present invention (which may be referred to as a "direct capture" device) can both remove cells/solids and perform all types of chromatography in a single unit. This helps to reduce the number of stages required in bioprocesses and to reduce costs.

Optionally, the adsorbent chromatography medium 12 comprises polymer nanofibers. For example, the adsorbent chromatography medium 12 may comprise cellulose nanofibers.

The adsorbent chromatography medium 12 of the chromatography system 10 may have a porosity of from 0.1 to 1.0 □m, preferably from 0.3 to 0.9□□m, more preferably from 0.4 to 0.8□□m, even more preferably from 0.5 to 0.7□□m, yet more preferably from 0.6 to 0.7□□m, for example from 0.6 to 0.65 □m.

The adsorbent chromatography medium 12 of the chromatography system 10 may have a density of from 200 to 1000 kg/m$^3$, preferably 250 to 750 kg/m$^3$, more preferably from 350 to 650 kg/m$^3$, in some circumstances from 450 to 550 kg/m$^3$. Other preferable densities include from 200 to 750 kg/m$^3$, 200 to 650 kg/m$^3$, 200 to 550 kg/m$^3$, 250 to 750 kg/m$^3$, 250 to 650 kg/m$^3$, and 250 to 550 kg/m$^3$.

The adsorbent chromatography medium 12 of the chromatography system 10 may have a thickness of 0.05 to 10 mm, for instance 0.1 to 5 mm.

Preferably, the adsorbent chromatography medium 12 of the chromatography system 10 is functionalised so that it is suitable for use in a chromatography method as defined herein, for instance ion exchange chromatography, affinity capture chromatography and hydrophobic chromatography.

The adsorbent chromatography medium 12 of the chromatography system 10 may be in the form of a membrane.

Optionally, the adsorbent chromatography medium 12 is obtainable by a process which comprises
(I) providing two or more non-woven sheets stacked one on top of the other, each said sheet comprising one or more polymer nanofibers,
(II) simultaneously heating and pressing the stack of sheets to fuse points of contact between the nanofibers of adjacent sheets, and
(III) contacting the pressed and heated product with a reagent which functionalises the product of step (II) as a chromatography medium.

The first step of the process involves providing a stack of two or more non-woven sheets. Thus, the process for preparing a polymeric medium for the adsorbent chromatography medium 12 comprises providing a stack of two or more non-woven sheets, each said sheet comprising two or more polymer nanofibers, and simultaneously heating and pressing the stack of sheets to fuse points of contact between the nanofibers of adjacent sheets.

This process may also involve wetting as defined herein and pressing a stack of two or more non-woven sheets as defined herein, followed by subsequent heating as defined herein. Typical wetting, pressing and heating conditions are as defined above. Thus the process for preparing a polymeric medium may comprise
(I) providing two or more non-woven sheets as defined herein stacked one on top of the other, each said sheet comprising one or more polymer nanofibers,
(II) wetting the stack of sheets with an optionally aqueous organic solvent,
(III) pressing the stack of sheets, and
(IV) heating the pressed stack to fuse points of contact between the nanofibers of adjacent sheets.

Preferred features for the polymeric medium of the invention and the process for producing that polymeric medium are set out in EP 3 055 059, the entire content of which is hereby incorporated by reference.

The polymer nanofibers used in embodiments of the present invention provide advantages over typical chromatographic bead based media as explained below.

Typical chromatographic bead based media achieve their high surface areas ~40 m$^2$ g by being highly porous with pore sizes between 15 and 40 nm. Therefore to avoid blocking of these pores solids from the feed material such as cell, cell debris, large aggregates and other colloidal material need first be removed. If such material is not removed the chromatographic media can become fouled which obscures binding sites for the target reducing effective capacity. In the case of larger suspended solids such as cells the tightly packed nature of these beds means that it is impossible to pass cells through a chromatography column rendering the column inoperable.

Methods to remove solids and other foulants from the feed are centrifugation, dead-end filtration, cross-flow filtration, flocculation, and acoustic wave separation. Due to the high expense of biopharmaceutical grade porous beads (~$15,000/L and several hundred litres needed per column) it is important to reduce foulant burden as much as possible to reduce the changes of fouling and to expand the number of cycles achievable and so amortise the initial purchase price. Therefore to achieve this level or purity the harvested cell culture material undergoes a series of expensive clarification steps before loading onto a column. For instance only 60% of cells might be removed after a centrifugation step requiring the need for further filtration steps with sequentially smaller pore sizes.

Typical binding capacities for porous beads are in the region of 35-120 mg/mL dependent on the functionality of the solid phase and species bound. In a porous bead-based system, the binding event between target molecule/impurity and the solid phase is dependent on diffusion into the porous bead. There is therefore a strong correlation between the residence time in a porous bead-based system and flowrate. Thus, binding capacity drops off with decreasing residence times. This in turn is accompanied by rapid reduction of capacity where times of less than 2 minutes are used in a porous bead-based system. The high flowrates required for short residence times can also be incompatible with porous beads, particularly at manufacturing scale where many litres of bead suspension are packed into a column. Here the mechanical instability of the porous beads can lead to compression or collapse events, which in turn results in a non-homogeneous column bed.

With flowrate impacting the residence time it is critical to maximise the amount of target that can be bound to the solid phase per unit time. This allows either smaller adsorbent volumes to be used and/or the separation to be performed in less time. This metric can be defined as grams bound, per unit volume, per unit time (mg/mL/min). The typical binding capacities and residence times for porous beads discussed above result in overall productivities for single column porous bead systems around 10-120 mg/mL/min.

As alternatives to porous bead-based systems, monoliths or membranes may be used. The flow through such materials is convective rather than diffusional, and their binding capacity is therefore far less sensitive to flow than porous bead-based systems. These materials can be run at far higher flowrates than porous bead-based materials, where typical residence times are in the order of 0.2-0.5 minutes.

However, typical binding capacities at 10% breakthrough of target for monoliths (10-20 mg/mL) and membranes (7.5-29 mg/mL) under dynamic flow are lower than porous beads (Gottschalk, U. (2008). Biotechnol Prog, 24(3), 496-503. doi: 10.1021/bp070452g). The inferior binding capacity of monolith and membrane materials (compared to porous bead-based materials) can be offset to some extent by utilising higher flowrates.

The typical binding capacities and residence times for monoliths and membranes discussed above result in overall productivities of the binding event for monolith and membrane systems around 10-145 mg/mL/min.

Nanofibers have larger pore sizes (0.2-2 μm) compared to porous resins making them more resistant to fouling. There is also evidence to suggest that they have a better pressure versus flow relationship compared to porous cast membranes, the latter showing dead-end structures which could be a hindrance to flow and create sites for fouling to build.

Figure 16:
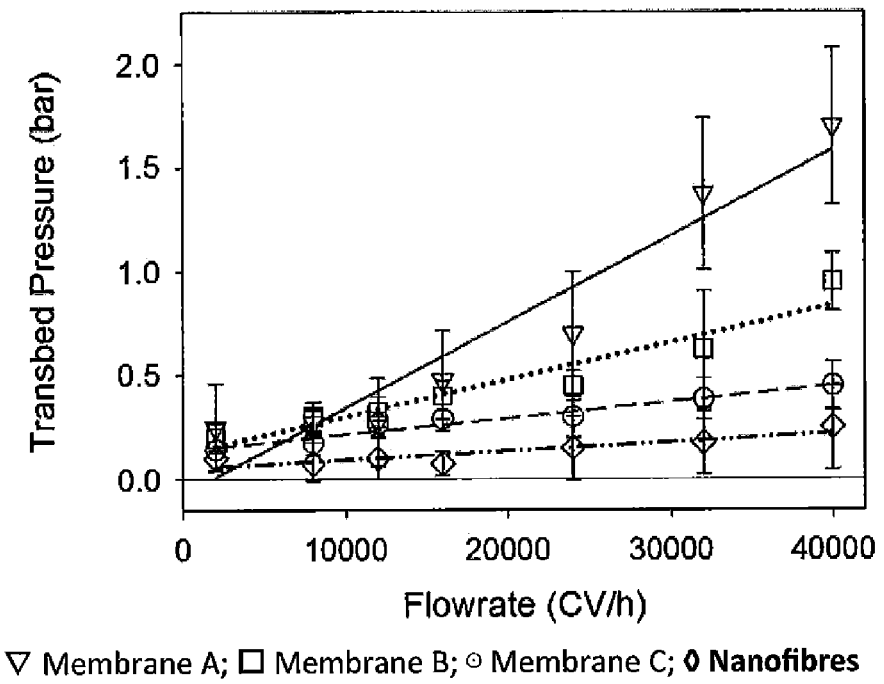
FIG. 16 is a graph showing the relationship between flow rate and pressure across the chromatography medium for different types of chromatography medium material.

FIG. 16 is a demonstration of a favourable pressure flow relationship of the nanofibre material compared to porous cast membranes.

The chromatography system 10 of the present invention, and in particular the chromatography system shown in FIG. 15, allows
  flow across the surface to remove/reduce amount of fouling whilst allowing a flowrate across the adsorbent to allow capture of target
  improved distribution (for reasons explained above)
  four ports that allow
    back-flow
    air bleed
    addition of media/buffer to dilute/top up circulating loop or feed cells
    removal of cells/solids that have been washed against the membrane form the system.

The high capacity at high flowrates of nanofibers allows operation and capture at higher flowrates, thereby reducing fouling. An embodiment of the present invention is expected to make it easier to rapidly cycle a unit to shrink the operation, or to use a larger unit to speed up processing.

Much of existing industrial scale biopharmaceutical manufacture is operated in batch format. However efforts are being made to transition individual processing steps and entire processes towards continuous processing. The benefits of continuous processing being that the scale of the unit operation can typically be reduced whilst processes are run for a prolonged duration which provides savings as start-up/shut-down activities can be amortised over more product produced from a facility.

The chromatography system 10 of the present invention can be operated in a continuous flow manner with upstream and downstream steps. The chromatography system 10 of the present invention can link directly with a bioreactor to continuously or intermittently purify the target from complex cell containing media. The chromatography system 10 of the present invention can be coupled in a loop with other upstream continuous steps such as alternating flow tangential filtration, hollow fibre filtration or acoustic wave separation. Elution material can either be pooled or run directly onto the next step which could be continuous. Multiple chromatography systems 10 of the present invention can be operated at once so that a continuous stream is delivered.

Examples of chromatography complexes comprising the chromatography system 10 of the present invention are set out below. Additionally, examples of chromatography processes using the chromatography system 10 of the present invention are set out below.

A chromatography complex according to the present invention comprises the chromatography system 10 as described above (e.g. the chromatography system 10 depicted in FIG. 15) and a suspension vessel. The suspension vessel is connected directly or indirectly to the inlet 11 of the chromatography system 10. The suspension vessel is for providing a flow of a suspension of material and/or colloidal material and/or charged material to the adsorbent chromatography medium 12. For example, the suspension may comprise feed cells.

The suspension vessel may be a bioreactor for containing cells expressing a biological molecule. Optionally the bioreactor contains cells expressing a biological molecule. Direct connection between the suspension vessel and the chromatography systems 10 means that an outlet of the suspension vessel connects to the inlet 11 of the chromatography system 10 without intermediate devices in which further processes are performed. Alternatively, indirect connection between the suspension vessel and the chromatography system 10 means that a further device for performing a further process on the suspension is positioned between the suspension vessel and the chromatography system 10.

For example, optionally the chromatography complex comprises a pool vessel. The pool vessel is configured such that the suspension of material can be sampled from the pool vessel. Hence, the pool vessel allows samples to be continually taken out for measuring one or more physical properties of the suspension of material.

The pool vessel may be connected to the suspension vessel and a chromatography system 10 such that it is downstream of the suspension vessel and upstream of the chromatography system 10. For example, the suspension vessel (which may also be called a culture vessel), the pool vessel and the chromatography system 10 may be connected in series with each other. The series connection allows a continuous flow of the suspension of material to pass from the suspension vessel to the pool vessel and on to the chromatography system 10.

Optionally, the chromatography complex comprises one or more foulant reduction devices. Each foulant production device is configured to process the suspension of material so as to reduce fouling of the adsorbent chromatography medium 12 by the suspension of material. For example, some cells could be removed from the suspension. Optionally, all cells could be removed from the suspension. Optionally, a proportion of other colloidal material such as components, aggregates etc. could be removed from the suspension of material.

Each foulant reduction device is connected in series to the suspension vessel and the chromatography system 10 such that it is downstream of the suspension vessel and upstream of the chromatography system 10.

Optionally, both a pool vessel and at least one foulant reduction device are provided in the chromatography complex. Preferably, the foulant reduction device is upstream of the pool vessel.

The method of reducing the foulant is not particularly limited. Technologies that could be used are alternating tangential flow filtration, hollow fibre filtration, charge based filtration, acoustic wave separation, centrifugation, flocculation, sedimentation and diafiltration. A combination of the technologies could be used to reduce both colloidal content but also reduce other components in the feed such as host cell proteins. Optionally, one or more of the foulant reduction devices comprises one or more of a tangential flow filtration device, a charge functionalised filtration media device, a diafiltration device, an acoustic wave separation device and an alternating tangential flow filtration device.

Optionally, the circulation loop 51 shown in FIG. 15 (which may also be called a retentate loop) is coupled to the one or more foulant reduction devices. Multiple foulant reduction devices may be connected in series to reduce the foulant burden.

By linking the inlet 11 of the chromatography system 10 to the suspension vessel (which may be called a cell culture vessel), this facilitates drawing out a sample of the culture, binding the target and eluting a purified stream.

The way in which the one or more biological molecules are isolated from the suspension of material is not particularly limited. For example, the chromatography system 10 of the present invention can both remove cells/solids and perform any or all of affinity chromatography, cation chromatography, anion chromatography or a mixture of chromatography types (i.e. any combination of the above-mentioned chromatography types).

As explained above, the chromatography system 10 may comprise a back flow inlet 52. The chromatography system 10 of the present invention can be operated in back flow. Back flow may be provided through the back flow inlet 52 and/or through the outlet 17. For example, back flow may be used to remove air (or other gases from the interior of the chromatography system 10). The device can be operated in back flow to return liquid volume to the circulation loop 51. For example, the liquid returned could be a cell culture fluid. The back flow of the membrane can be used to "top-up" the volume of the retentate loop (this means that the colloidal material does not become a concentration which would increase fouling). The device can be operated in back flow to remove cells or other solids to waste on the retentate side of the adsorbent chromatography medium 12.

The circulation loop 51 could be coupled to any compatible upstream technology to reduce foulant burden, as explained above.

The circulation loop 51 of the chromatography system 10 may be coupled to any compatible upstream technology in a continuous manner. This means that the chromatography process can be performed continuously, rather than batches. This increases productivity.

Optionally, the chromatography system 10 is functionally sterile. This has the advantage that other operations have a lower bioburden and it reduces that chances of contamination of upstream cell culture.

Optionally, the elution flow from the chromatography system 10 can be connected directly to a continuous viral inactivation step. For example, a chromatography complex according to an embodiment of the present invention comprises a virus processing unit configured to process one or more viruses. The virus processing unit may be connected to the outlet 17 (and/or to the back flow inlet 52) of the chromatography system such that one or more elution flows can flow from the chromatography system 10 to the virus processing unit.

For example, the virus processing unit may be a viral inactivation unit configured to render one or more viruses inactive. The method of rendering the viruses inactive is not particularly limited. For example, the viral inactivation unit may be configured to render the one or more viruses inactive by acidic pH inactivation. Additionally or alternatively, the viral inactivation unit is configured to render the one or more viruses inactive by applying UV radiation. Other methods of viral inactivation are also compatible with the present invention.

When viral inactivation is promoted by a low pH, the duration of the inactivation process could be controlled by selecting the length of pipe containing the low pH material through which the virus travels.

Optionally, the chromatography system 10 of an embodiment of the invention can be used for rapid sampling and analytics of cell culture. This may be for "off-line" analytics or "on-line" real time measurement of concentration of products or contaminants in the feed. Optionally, these could be linked to algorithms for altering inputs to the suspension vessel e.g. $O_2$ addition.

Figure 17:
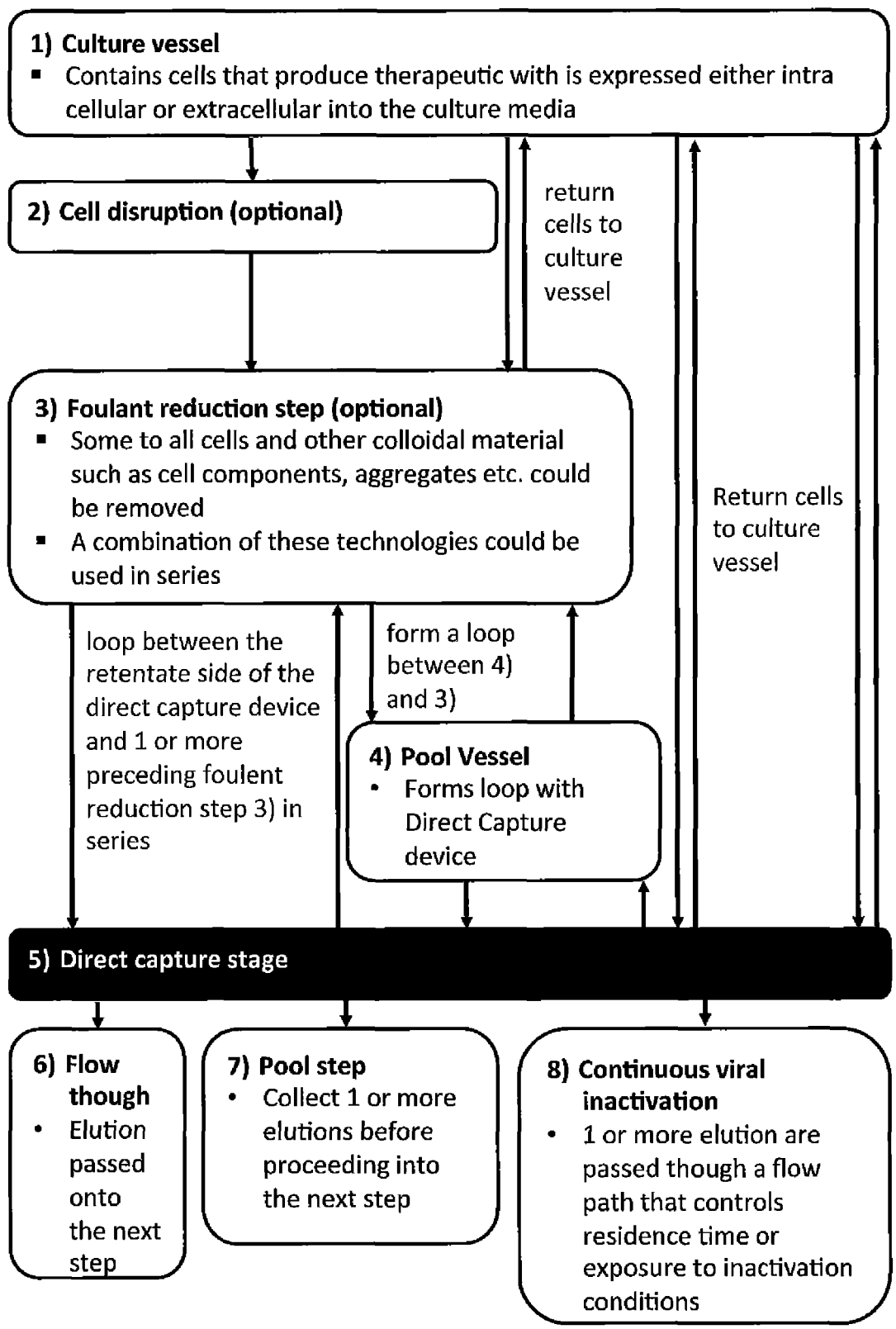
FIG. 17 is a flowchart illustrating different possible steps in a chromatography process according to an embodiment of the present invention.

FIG. 17 is a flow chart showing possible variations of steps involved in chromatography processes according to the embodiments of the present invention. FIG. 17 also shows ways in which different pieces of hardware such as the suspension vessel (or culture vessel), pool vessel and chromatography system 10 (or direct capture stage) can be combined.

FIGS. 18 to 21 each illustrate a flow chart for a specific embodiment of a chromatography process according to an embodiment of the present invention.

Figure 18:
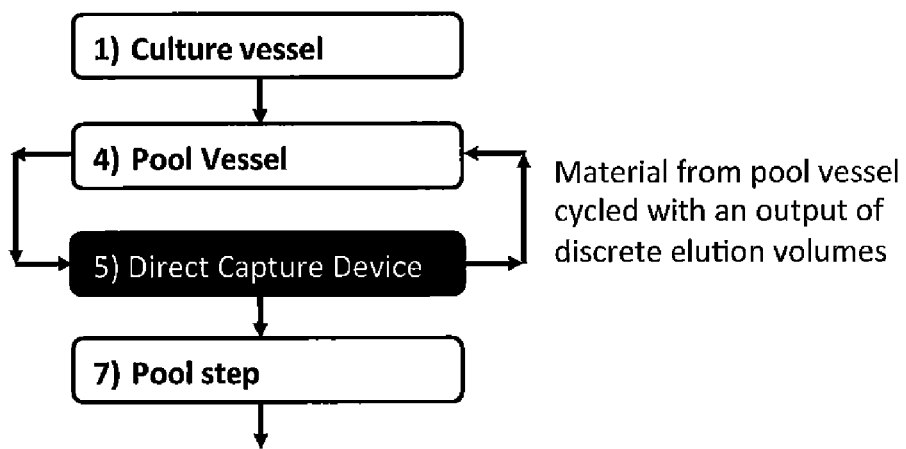
FIG. 18 is a flowchart illustrating a chromatography process according to an embodiment of the present invention.

In the process shown in FIG. 18, a suspension vessel (or culture vessel) comprises the suspension of material. The culture vessel is connected in series with a pool vessel. The suspension vessel provides a flow of the suspension of material to the pool vessel.

The pool vessel may be comprised in the circulation loop 51 shown in FIG. 15. Hence, the chromatography system 10 (or direct capture device) is looped together with the pool vessel. Accordingly, material from the pool vessel can be cycled with an output of discrete elution volumes.

Optionally, a further pool vessel may be connected to the outlet 17 of the chromatography system 10 for collecting one or more elutions before processing proceeds into the next step.

Figure 19:
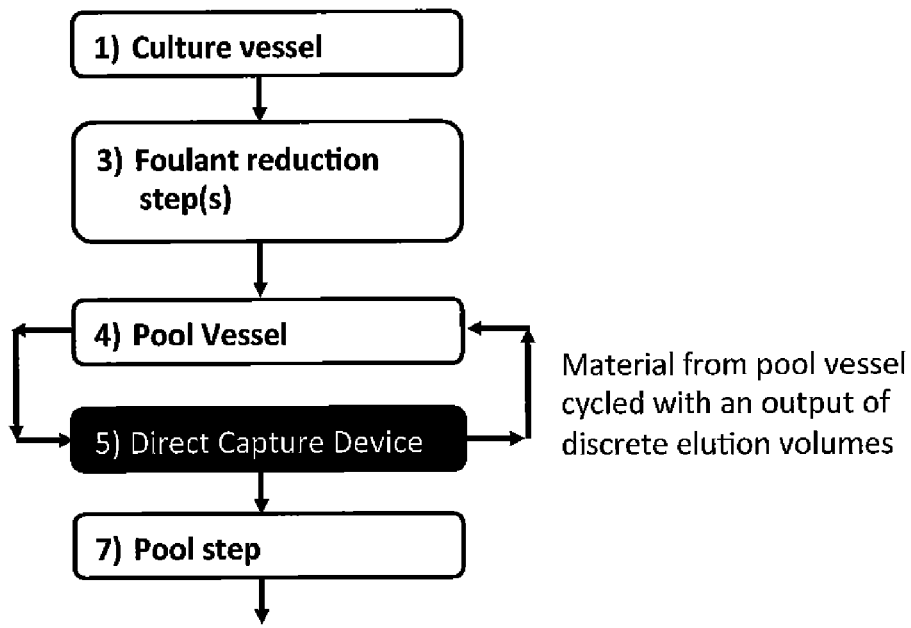
FIG. 19 is a flowchart illustrating a chromatography process according to an embodiment of the present invention.

FIG. 19 illustrates a further variation of the chromatography process illustrated in FIG. 18, but with an additional foulant reduction step (or multiple foulant reduction steps). For example, one or more foulant reduction devices may be positioned between the suspension vessel and the pool vessel. The foulant reduction devices can be used to reduce the amount of foulant in the suspension of material before the suspension is then pooled in the pool vessel. The pool vessel may be looped together with the chromatography system 10 such that material from the pool vessel is cycled through the chromatography system 10. The cycling of the suspension of material through the circulation loop 51 helps to reduce fouling of the adsorbent chromatography medium 12.

Figure 20:
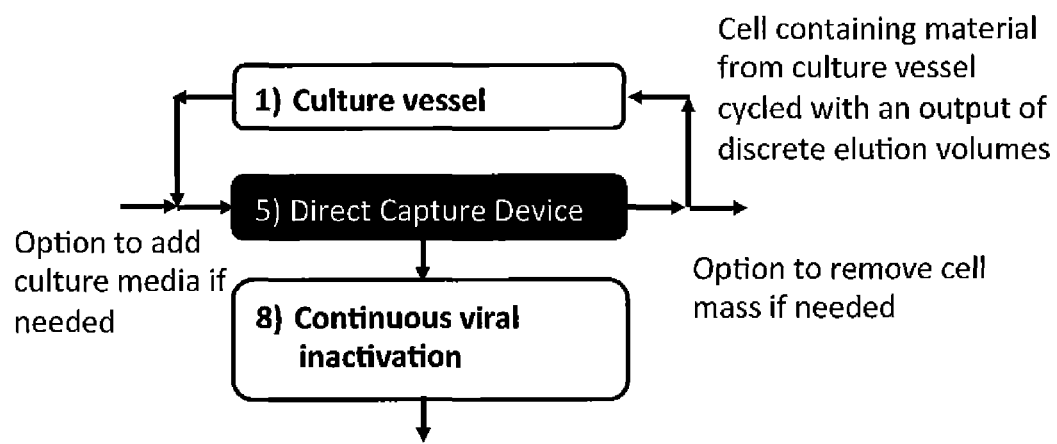
FIG. 20 is a flowchart illustrating a chromatography process according to an embodiment of the present invention.

FIG. 20 is a flow chart of an alternative embodiment of a chromatography process according to the present invention. In the process illustrated in FIG. 6, the suspension vessel may be looped together with the chromatography system 10. In particular, the suspension vessel may be comprised in the circulation loop 51. This is different from the situation shown in FIGS. 18 and 19 in which the pool vessel is looped together with the chromatography system 10 (but the suspension vessel is not necessarily looped together with the chromatography system 10).

The suspension of material supplied from the suspension vessel passes through the chromatography system 10 and may then be recycled through the circulation loop 51 back to the suspension vessel and then back to the chromatography system 10. Optionally, additional culture media can be added. For example, the back flow inlet 52 could be used to add additional culture media. The additional culture media would then flow in the upstream direction back through the adsorbent chromatography medium 12 to join the flow in the circulation loop 51.

Optionally, cell mass (or other matter) could be removed from the flow of suspension in the circulation loop 51. For example, a valve system may be used in the circulation loop 51 to optionally remove mass from the flow in the circulation loop as and when necessary.

As shown in FIG. 20, optionally there is a step of continuous viral inactivation downstream of the chromatography system 10. For example, a viral inactivation unit may be connected to the outlet 17 of the chromatography system 10. One or more viruses in the flow through the outlet 17 may be rendered inactive.

Figure 21:
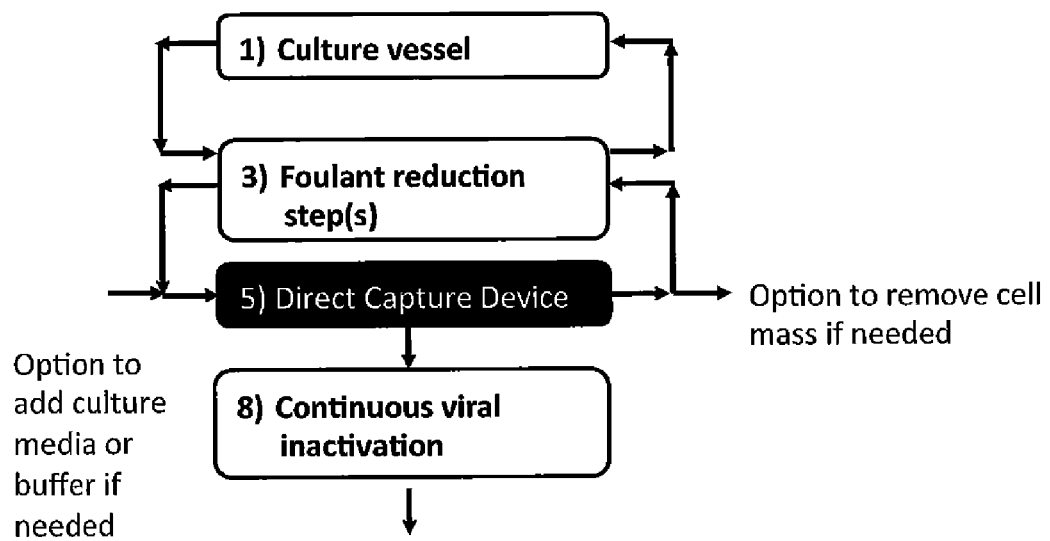
FIG. 21 is a flowchart illustrating a chromatography process according to an embodiment of the present invention.

FIG. 21 is a variation of the chromatography process shown in FIG. 20. As shown in FIG. 21, in an embodiment the chromatography process comprises one or more foulant reduction steps. For example, one or more foulant reduction devices may be positioned downstream of the suspension vessel and upstream of the chromatography system 10. The foulant reduction device (or multiple foulant reduction devices connected in series) may be comprised in the circulation loop 51 of the chromatography system 10.

As depicted in FIG. 21, the suspension vessel may be looped together with the one or more foulant reduction devices. Hence, the chromatography complex may comprise multiple circulation loops. In the embodiment shown in FIG. 21, there are two circulation loops. One circulation loop continuously cycles a flow of the suspension of the material between the suspension vessel and the foulant reduction devices. A further loop cycles the suspension of material between the foulant reduction devices and the chromatography system 10.

In a further alternative embodiment, a single circulation loop may be formed to cycle the suspension of material between each of the suspension vessel, foulant reduction devices and the chromatography system 10. For example, the suspension of material may continuously cycle in a loop from the suspension vessel, through the foulant reduction devices, through the chromatography system 10 and back to the suspension vessel where the cycle starts again.

As explained above, the chromatography system 10 of the present invention can be used to perform repeat cycles of material from the suspension/pool vessels.

Figure 22:
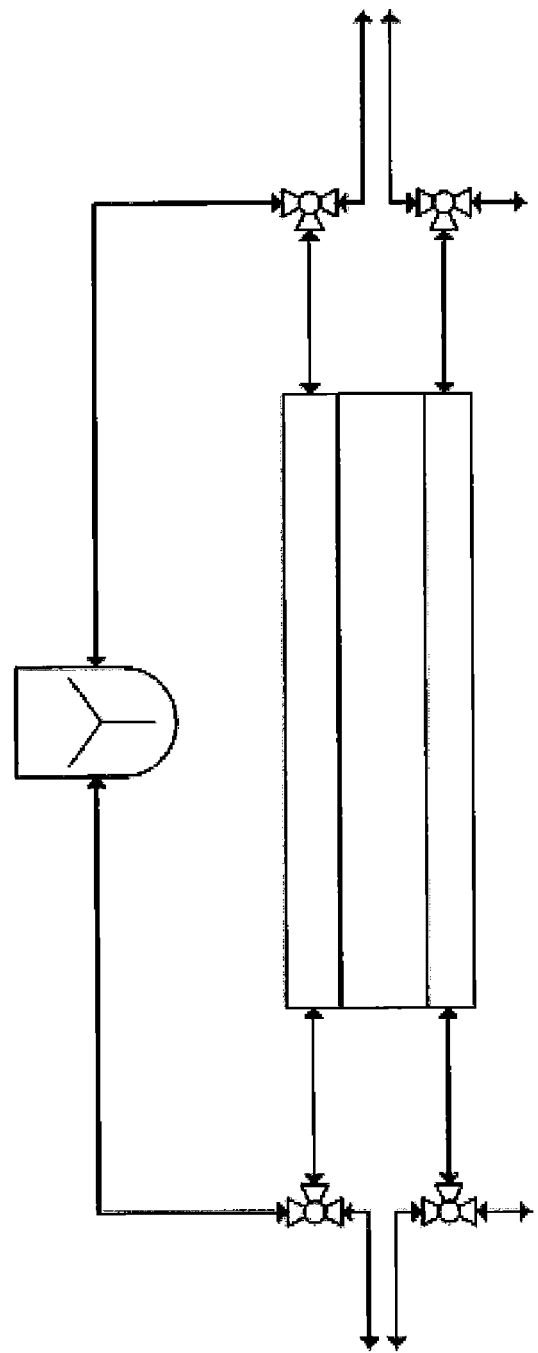
FIG. 22 is diagram illustrating the direction of flow chromatography system according to an embodiment of the present invention.

FIG. 22 is a diagram illustrating the direction of flow in a chromatography system according to an embodiment of the present invention. The design is very flexible. One side has particulates and a re-circulation loop, while one side does not. That makes it possible to wash, elute, or add volume or remove volume through any of the four ports.

Figure 23:
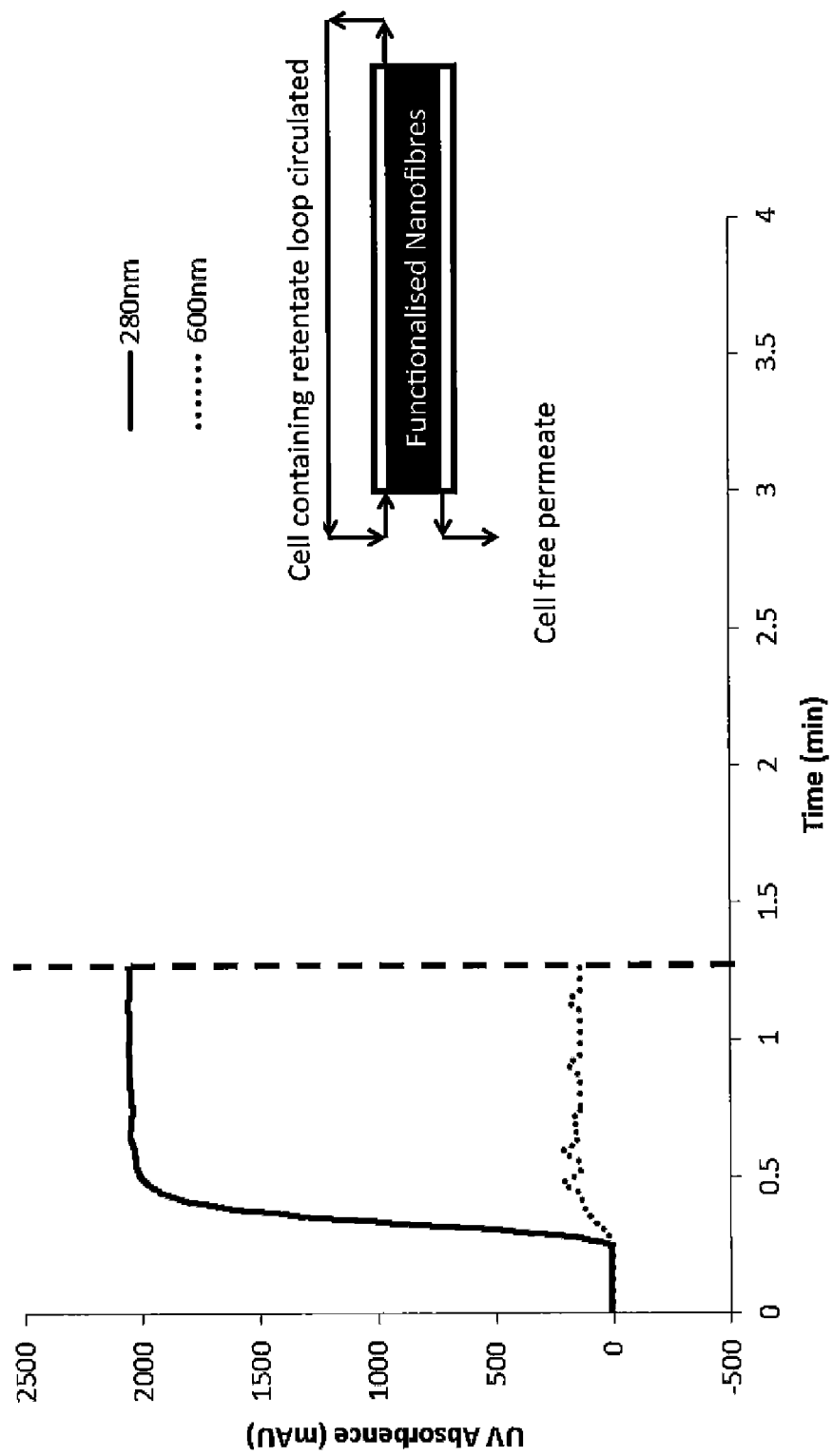
FIG. 23 shows the potential flow path and associated chromatogram in the load phase of operation according to an embodiment of the present invention.

FIG. 23 shows the potential flow path and associated chromatogram in the load phase of operation according to an embodiment of the present invention. There are several ways to operate the device. FIG. 23 shows the retentate loop (containing the cells) being circulated whilst material depleted of cells/particulates and "non-target" protein leave from the "cell free permeate" port (through the use of a valve blocking off the elution port).

Figure 24:
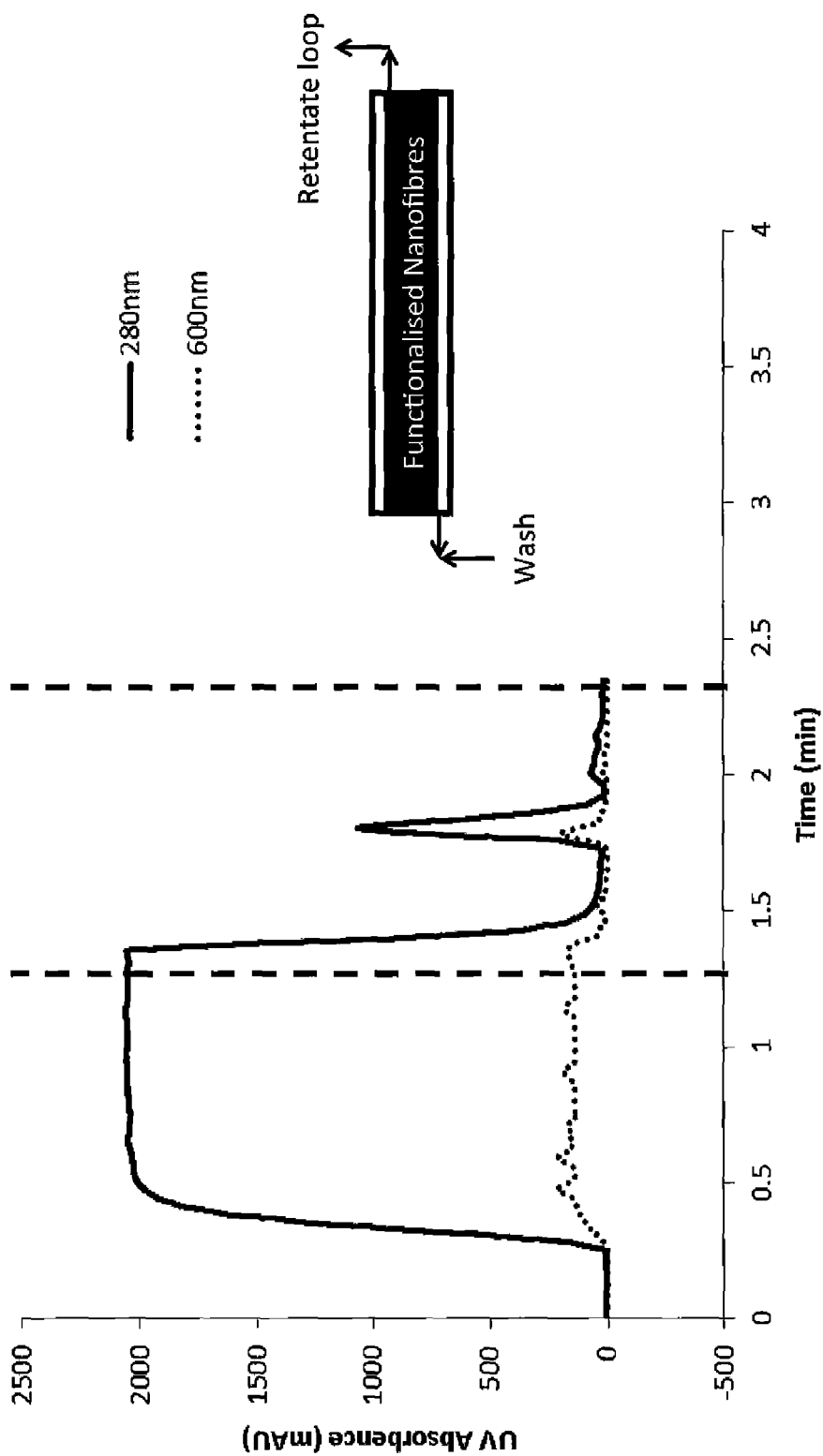
FIG. 24 shows the potential flow path and associated chromatogram in the wash phase of operation according to an embodiment of the present invention.

FIG. 24 shows the potential flow path and associated chromatogram in the wash phase of operation according to an embodiment of the present invention. Optionally, the wash phase comprises "back washing" to lift cells/particulates off the membrane. This could be done to from either the permeate port (as shown) or the elution port. In this example the wash buffer is added into the retentate loop (thus keeping the volume of that loop constant over the cycles). However it is possible (through the use of valves) to send the wash to waste.

Figure 25:
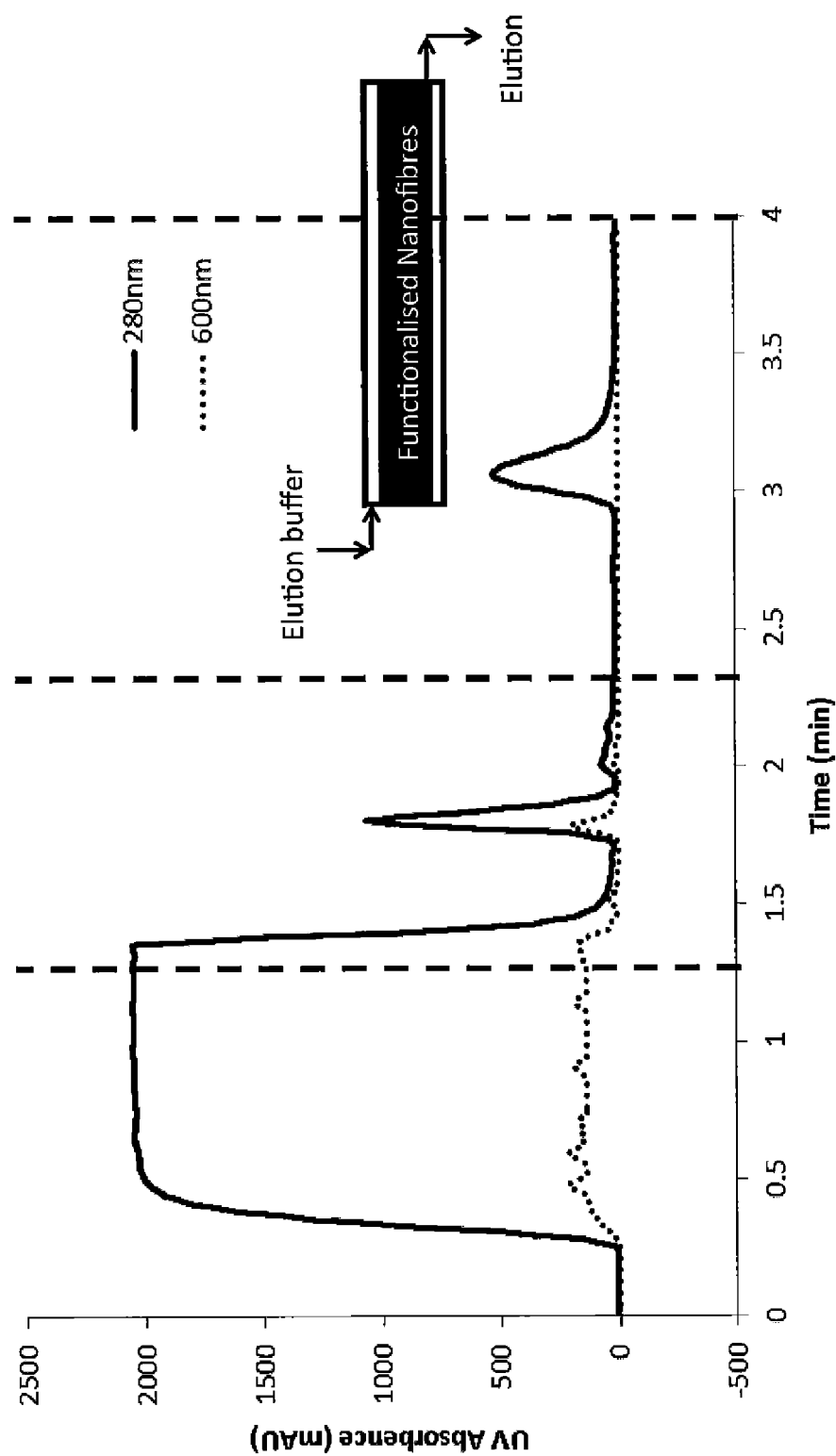
FIG. 25 shows the potential flow path and associated chromatogram in the elution phase of operation according to an embodiment of the present invention.

FIG. 25 shows the potential flow path and associated chromatogram in the elution phase of operation according to an embodiment of the present invention. The elution buffer is run through the membrane and out of the elution port. This could be run between any two ports that are on the corners of the device e.g. FIG. 25 shows top left to bottom right, but it could alternatively be bottom right to top left. Preferably, the elution flow is out of the "clean" non-particulate side of the device.

Figure 26:
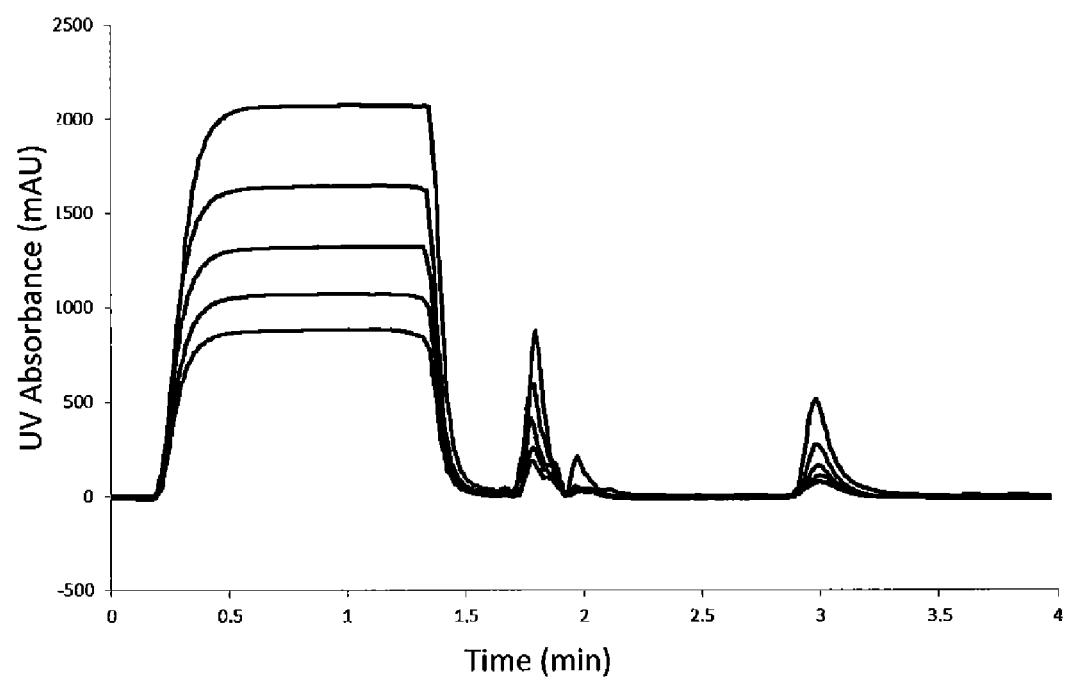
FIG. 26 shows superimposed repeat bind, wash and elute cycles of Chinese hamster ovary cell culture containing monoclonal antibody which is selectively adsorbed to Protein A functionalised nanofibres.

FIG. 26 shows superimposed repeat bind, wash and elute cycles of Chinese hamster ovary cell culture containing monoclonal antibody which is selectively adsorbed to Protein A functionalised nanofibers. The depletion of mAb and other contaminant proteins can be seen by the decrease in height of the "load" peak. The elution peak is being reduced as less mAb is being loaded per cycle (load duration is kept constant over the cycles—so as the concentration reduces the amount bound is also reduced).

The type of chromatography used in the example illustrated in FIGS. 23 to 26 is Protein A affinity (elution by lowering pH).

The various features of the chromatography system 10 outlined above can be provided separately or in combination with each other. For example, a chromatography system 10 may be provided having the ridges 32 as well as the draft angle between the adsorbent chromatography medium 12 and the upstream channel member 13. Alternatively, these features may be provided separately from each other because they do not rely on each other. Most of the features have been described in the context of a chromatography system for radial flow chromatography. However, the features such as the draft angle and the ridges are equally applicable and advantageous in the context of a chromatography system for tangential flow chromatography or lateral flow chromatography. It will be appreciated that certain further modifications may be made to the specific examples described above while remaining within the scope of the claims.

Optionally, a plurality of chromatography systems 10 and/or other units are combined together by a manifold. For example, piping may be provided to divide liquid flow along a plurality of channels for different chromatography systems 10 and/or other units.

The manifold may be formed by piping according to various different arrangements. For example, in an embodiment piping is be split in a 1:2 ratio at one or more divisions so as to provide the desired number of liquid flows corresponding to the desired number of units. The number of units is not particularly limited and may be two, four, eight or 16, for example. It is not necessary for the ratio at each division to be 1:2. For example, in an alternative embodiment at each division the flow is split into three even flows, i.e. a ratio of 1:3.

In an embodiment the manifold comprises one or more pressure regulators, flow regulators and physical flow restrictors at inlets and/or outlets of the manifold. The pressure regulators, flow regulators and physical flow restrictors are configured to make flow distribution across the units more even.

In an embodiment there is provided a distributor configured to distribute a flow of liquid to a plurality of chromatography systems 10 of the present invention. Optionally, the distributor is a structure comprising fractal elements. The distributor comprises a port to which liquid is introduced. The liquid is divided to flow through successively divided conduit branches. The recursive division may be continued as desired to provide sufficient density of fluid exits or entrances. The distributor may be configured by conduits arranged in fractal patterns using any well-known fabrication technique such as matrices of pipe, molded or machined tiles, or stamped plate.

The invention claimed is:

1. A chromatography system for at least one of tangential flow chromatography and lateral flow chromatography comprising:
    an inlet;
    a functionalized planar adsorbent chromatography medium downstream of the inlet, wherein the adsorbent chromatography medium is formed of one or more non-woven sheets, each comprising one or more polymer nanofibers, the adsorbent chromatography medium extending between a first edge of the adsorbent chromatography medium, facing the inlet and a second edge of the adsorbent chromatography medium, the second edge opposing the first edge;
    an outlet downstream of and facing the second edge of the adsorbent chromatography medium; and
    a flow guide downstream of the inlet and upstream of the adsorbent chromatography medium and configured to distribute a flow of a liquid from the inlet across a width along the first edge of the adsorbent chromatography medium,
    wherein the flow guide comprises a pattern of channels providing flow paths from the inlet to different parts of the adsorbent chromatography medium along the first edge and across the width of the adsorbent chromatography medium,
    wherein the pattern of channels is provided so as to reduce a difference in arrival time and/or flow velocity of liquid reaching the adsorbent chromatography medium from the inlet through the flow guide across the width of the adsorbent chromatography medium,
    wherein the pattern of channels extends along and subdivides along a downstream direction parallel to a direction from the second edge toward the first edge of the chromatographic medium, and
    wherein the pattern of channels is arranged such that longer flow paths have a smaller cross-sectional area than shorter flow paths.

2. The chromatography system of claim 1, wherein the pattern of channels is arranged such that the flow paths have lengths within 50% of each other.

3. The chromatography system of claim 1, wherein the pattern of channels comprises a channel from the inlet that divides into two symmetric channels and each symmetric channel divides successively into two symmetric channels until the flow paths reach the adsorbent chromatography medium.

4. The chromatography system of claim 1, wherein the pattern of channels are defined between a plurality of ridges.

5. The chromatography system of claim 4, wherein the plurality of ridges is arranged such that flow paths in a middle portion are the widest.

6. The chromatography system of claim 5, wherein the widths of the flow paths progressively decrease going from the flow paths in the middle portion to respective outermost flow paths.

7. The chromatography system of claim 1, wherein:
    the chromatography system is configured to filter particulates from a flow of a suspension of material, and to isolate one or more biological molecules from the suspension of material by contacting one or more biological molecules in the suspension of material with the adsorbent chromatography medium.

8. The chromatography system of claim 1, wherein the chromatography system is functionally sterile.

9. A method of performing tangential flow filtration and at least one of tangential flow chromatography and lateral flow chromatography comprising:
    providing a chromatography system according to claim 1;
    providing a flow comprising a suspension of material and/or colloidal material and/or charged material through the inlet to the adsorbent chromatography medium;
    recirculating the flow comprising the material through a recirculation loop including the inlet to the adsorbent chromatography medium; and
    providing a flow comprising at least one of a buffer and a cleaning agent through a backflow inlet on the same side of the adsorbent chromatography medium as the outlet and back through the adsorbent chromatography medium.

10. A process for isolating one or more biological molecules from a mobile phase using the chromatography system or chromatography complex of claim 1, wherein the process comprises contacting one or more biological molecules in a mobile phase with the adsorbent chromatography medium.

11. A chromatography system for at least one of tangential flow chromatography and lateral flow chromatography comprising:
    an inlet;
    a functionalized planar adsorbent chromatography medium downstream of the inlet, wherein the adsorbent chromatography medium is formed of one or more non-woven sheets, each comprising one or more polymer nanofibers, the adsorbent chromatography medium extending between a first edge of the adsorbent chromatography medium, facing the inlet and a second edge of the adsorbent chromatography medium, the second edge opposing the first edge;
    an outlet downstream of and facing the second edge of the adsorbent chromatography medium; and
    a flow guide downstream of the inlet and upstream of the adsorbent chromatography medium and configured to distribute a flow of a liquid from the inlet across a width along the first edge of the adsorbent chromatography medium,
    wherein the flow guide comprises a pattern of channels providing flow paths from the inlet to different parts of the adsorbent chromatography medium along the first edge and across the width of the adsorbent chromatography medium,
    wherein the pattern of channels is provided so as to reduce a difference in arrival time and/or flow velocity of liquid reaching the adsorbent chromatography medium from the inlet through the flow guide across the width of the adsorbent chromatography medium, wherein the pattern of channels extends along and subdivides along a downstream direction parallel to a direction from the second edge toward the first edge of the chromatographic medium, and wherein the pattern of channels is arranged such that a width of the channels changes with each successive split towards the adsorbent chromatography medium.

12. The chromatography system of claim 11, wherein the pattern of channels is arranged such that the width of the channels increases with each successive split towards the adsorbent chromatography medium.

13. The chromatography system of claim 11, wherein the pattern of channels is arranged such that the width of the channels decreases with each successive split towards the adsorbent chromatography medium.

14. The chromatography system of claim 11, wherein the pattern of channels is arranged such that the flow paths have lengths within 50% of each other.

15. The chromatography system of claim 11, wherein the pattern of channels comprises a channel from the inlet that divides into two symmetric channels and each symmetric channel divides successively into two symmetric channels until the flow paths reach the adsorbent chromatography medium.

16. The chromatography system of claim 11, wherein the pattern of channels extends within a single plane.

17. The chromatography system of claim 11, wherein:

the chromatography system is configured to filter particulates from a flow of a suspension of material, and to isolate one or more biological molecules from the suspension of material by contacting one or more biological molecules in the suspension of material with the adsorbent chromatography medium.

18. The chromatography system of claim 11, wherein the chromatography system is functionally sterile.

19. A method of performing tangential flow filtration and at least one of tangential flow chromatography and lateral flow chromatography comprising:

providing a chromatography system according to claim 11;

providing a flow comprising a suspension of material and/or colloidal material and/or charged material through the inlet to the adsorbent chromatography medium;

recirculating the flow comprising the material through the recirculation loop including the inlet to the adsorbent chromatography medium; and providing a flow comprising at least one of a buffer and a cleaning agent through a backflow inlet on the same side of the adsorbent chromatography medium as the outlet and back through the adsorbent chromatography medium.

20. A process for isolating one or more biological molecules from a mobile phase using the chromatography system or chromatography complex of claim 11, wherein the process comprises contacting one or more biological molecules in a mobile phase with the adsorbent chromatography medium.

* * * * *